(12) United States Patent
van der Mee et al.

(10) Patent No.: US 9,328,240 B2
(45) Date of Patent: May 3, 2016

(54) POLYCARBONATE COMPOSITIONS, ARTICLES FORMED THEREFROM, AND METHODS OF MANUFACTURE THEREOF

(71) Applicant: SABIC Innovative Plastics IP B.V., Bergen op Zoom (NL)

(72) Inventors: Mark Adrianus Johannes van der Mee, Breda (NL); Roland Sebastian Assink, Middelburg (NL); Paul Dean Sybert, Evansville, IN (US); Guillaume Philippe Colette Lavergne, Paris (FR); Robert Dirk van de Grampel, Tholen (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 61 days.

(21) Appl. No.: 13/724,780

(22) Filed: Dec. 21, 2012

(65) Prior Publication Data

US 2014/0179843 A1   Jun. 26, 2014

(51) Int. Cl.

| C08L 69/00 | (2006.01) |
|---|---|
| C08L 83/10 | (2006.01) |
| C08L 83/04 | (2006.01) |
| C08G 73/10 | (2006.01) |
| C08K 3/00 | (2006.01) |
| C08K 5/49 | (2006.01) |
| C08G 77/04 | (2006.01) |
| C08G 77/442 | (2006.01) |
| C08G 77/448 | (2006.01) |
| C08K 3/22 | (2006.01) |

(52) U.S. Cl.
CPC ........... *C08L 69/005* (2013.01); *C08G 73/1053* (2013.01); *C08G 73/1071* (2013.01); *C08L 69/00* (2013.01); *C08L 83/04* (2013.01); *C08L 83/10* (2013.01); *C08G 77/04* (2013.01); *C08G 77/442* (2013.01); *C08G 77/448* (2013.01); *C08K 3/0058* (2013.01); *C08K 5/49* (2013.01); *C08K 2003/2241* (2013.01); *C08L 2201/02* (2013.01)

(58) Field of Classification Search
CPC ........ C08G 64/04; C08G 64/06; C08G 77/04; C08G 77/42; C08G 77/448; C08G 77/80; C08L 83/04; C08L 83/10; C08L 69/00; C08L 2201/02
USPC .......................................... 525/461, 462, 464
See application file for complete search history.

(56) References Cited

U.S. PATENT DOCUMENTS

| 3,972,902 A | 8/1976 | Heath et al. |
|---|---|---|
| 4,387,193 A | 6/1983 | Giles, Jr. |
| 4,455,410 A | 6/1984 | Giles, Jr. |
| 4,548,997 A | 10/1985 | Mellinger et al. |
| 5,387,639 A | 2/1995 | Sybert et al. |
| 6,072,011 A | 6/2000 | Hoover |
| 7,767,738 B2 | 8/2010 | Gaggar et al. |
| 7,790,292 B2 | 9/2010 | Colborn et al. |
| 2004/0039145 A1 | 2/2004 | Silva et al. |
| 2004/0220330 A1* | 11/2004 | DeRudder et al. ............ 524/837 |
| 2005/0159577 A1 | 7/2005 | Davis et al. |
| 2006/0125143 A1 | 6/2006 | Donea et al. |
| 2006/0142527 A1 | 6/2006 | Glasgow et al. |
| 2007/0049706 A1 | 3/2007 | Siripurapu et al. |
| 2007/0066737 A1 | 3/2007 | Gallucci et al. |
| 2007/0129492 A1 | 6/2007 | Colborn et al. |
| 2008/0004404 A1 | 1/2008 | Van de Grampel et al. |
| 2008/0119631 A1* | 5/2008 | Mullen ........................ 528/203 |
| 2009/0306258 A1 | 12/2009 | Siripurapu et al. |
| 2009/0318629 A1 | 12/2009 | Adoni et al. |
| 2011/0060106 A1 | 3/2011 | De Kraker et al. |
| 2011/0229704 A1 | 9/2011 | Grcev et al. |

FOREIGN PATENT DOCUMENTS

| CA | 2157082 A1 | 5/1996 |
|---|---|---|
| CN | 1721404 A | 1/2006 |
| DE | 3844183 A1 | 6/1990 |
| EP | 0645422 A1 | 3/1995 |
| JP | 09183893 | 7/1997 |
| JP | 10007897 | 1/1998 |

(Continued)

OTHER PUBLICATIONS

U.S. Appl. No. 13/780,355, filed with the USPTO on Feb. 28, 2013.
U.S. Appl. No. 13/780,430, filed with the USPTO on Feb. 28, 2013.
U.S. Appl. No. 13/874,700, filed with the USPTO on May 1, 2013.
U.S. Appl. No. 13/874,746, filed with the USPTO on May 1, 2013.
U.S. Appl. No. 13/874,896, filed with the USPTO on May 1, 2013.
U.S. Appl. No. 13/915,710, filed with the USPTO on Jun. 12, 2013.
Gallucci et al., "New High Impact Miscible Polycarbonate Polyimide Blends", ANTEC conference proceedings, vol. 7, 2005, 6 pages.

(Continued)

*Primary Examiner* — Robert Jones, Jr.
(74) *Attorney, Agent, or Firm* — Cantor Colburn LLP

(57) ABSTRACT

A composition comprises a first polycarbonate having a limited oxygen index of greater than 26% measured according to ISO 4589 on a 4 mm thick plaque, wherein an article molded from the first polycarbonate has a smoke density after 4 minutes (DS-4) of greater than 600 determined according to ISO 5659-2 on a 3 mm thick plaque at 50 kW/m$^2$; and a second polymer different from the first polycarbonate, the second polymer comprising a poly(carbonate-siloxane) copolymer, a polydialkylsiloxane, or a combination comprising at least one of the foregoing; wherein an article molded from the second polymer has a smoke density after 4 minutes (DS-4) of greater than 600 determined according to ISO 5659-2 on a 3 mm thick plaque at 50 kW/m$^2$; wherein an article molded from the composition has a smoke density after 4 minutes (DS-4) of smaller than 480 determined according to ISO 5659-2 on a 3 mm thick plaque at 50 kW/m$^2$.

49 Claims, 4 Drawing Sheets

(56) References Cited

FOREIGN PATENT DOCUMENTS

| WO | 9410245 A1 | 5/1994 |
|---|---|---|
| WO | 2013130809 A1 | 9/2013 |

OTHER PUBLICATIONS

Heat Release, Currenta GmbH & Co. OHG information sheet: "prCEN/TS 45545-2 (Feb. 2008)—Fire protection on railway vehicles: Heat Release", Feb. 2008, 3 pages.
Lateral Flame Spread, Currenta GmbH & Co. OHG information sheet: "CEN TS 45545-2 (Feb. 2008)—Fire protection on railway vehicles: Lateral Flame Spread", Feb. 2008, 2 pages.
Lin et al., "Polymers with Improved Flammability chracteristics. I.Phenolphthalein-Related Homopolymers", Journal of Polymer Science: Polymer Chemistry Edition, Vo. 19, pp. 2659-2670, 1981, XP009050158.
Smoke Optical Density and Toxicity, Currenta GmbH & Co. OHG information sheet: "prCEN/TS 45545-2 (Feb. 2008)—Fire protection on railway vehicles: Smoke optical desnity and toxicity", Feb. 2008, 4 pages.
International Search Report for International Application No. PCT/US2013/076408, International Application Filing Date Dec. 19, 2013, Date of Mailing Apr. 23, 2014, 5 pages.
Written Opinion for International Application No. PCT/US2013/076408, International Application Filing Date Dec. 19, 2013, Date of Mailing Apr. 23, 2014, 10 pages.
Schartel, B. "Phosphorus-based Flame Retardency Mechanisms—Old Hat or a Starting Point for Future Development?", Materials, 2010, vol. 3, pp. 4710-4745.

* cited by examiner

POLYCARBONATE COMPOSITIONS, ARTICLES FORMED THEREFROM, AND METHODS OF MANUFACTURE THEREOF

BACKGROUND

This disclosure is directed to polycarbonate compositions, articles formed therefrom, and their methods of manufacture, and in particular low smoke density, low heat release polycarbonate compositions, articles formed therefrom, and their methods of manufacture.

Polycarbonates are useful in a wide variety of applications at least in part because of their good balance of properties, such as moldability, heat resistance and impact properties, among others. However, polycarbonates generate smoke and heat upon burning, which makes them less suitable for applications in mass transportation (aircraft, trains, and ships), as well as in building and construction. Recently, the European Union has approved the introduction of a new harmonized fire standard for rail applications, namely EN-45545, to replace all currently active different standards in each member state, which will become fully active within the next two to three years. This standard will impose stringent requirements on smoke density and heat release properties allowed for materials used in rail interior applications. Smoke density (Ds-4) in EN-45545 is the smoke density after 4 minutes determined in accordance with ISO 5659-2, and heat release in EN-45545 is the maximum average rate of heat emission (MAHRE) determined in accordance with ISO 5660-1.

It is exceptionally challenging to develop materials that meet stringent smoke density standards in addition to other material requirements. It is particularly challenging to develop materials that meet these requirements and that have good mechanical properties and processability. Accordingly, there remains a need in the art for polycarbonate compositions that have excellent low smoke or low heat release properties. It would be a further advantage if the compositions could be rendered low smoke or low heat release without a significant detrimental effect on one or more of material cost, processability, and mechanical properties. It would be a still further advantage if the materials could be readily thermoformed or injection molded.

SUMMARY

A composition comprises a first polycarbonate having a limited oxygen index of greater than 26% determined according to ISO 4589 on a 4 mm thick plaque, wherein an article molded from the first polycarbonate has a smoke density after 4 minutes (DS-4) of greater than 600 determined according to ISO 5659-2 on a 3 mm thick plaque at 50 kW/m²; and second polymer different from the first polycarbonate, the second polymer comprising a poly(carbonate-siloxane) copolymer, a polydialkylsiloxane, or a combination comprising at least one of the foregoing; wherein an article molded from the second polymer has a smoke density after 4 minutes (DS-4) of greater than 600 determined according to ISO 5659-2 on a 3 mm thick plaque at 50 kW/m²; wherein an article molded from the composition has a smoke density after 4 minutes (DS-4) of less than or equal to 480 determined according to ISO 5659-2 on a 3 mm thick plaque at 50 kW/m².

In another embodiment, a composition comprises, based on the weight of the composition, 65 to 95 wt. % of a polycarbonate copolymer comprising bisphenol A carbonate units and units of the formula

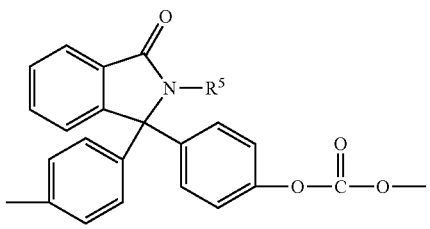

wherein $R^5$ is hydrogen, phenyl optionally substituted with 1 to 5 $C_{1-6}$ alkyl groups, or $C_{1-4}$ alkyl; and 5 to 35 wt. % of a poly(carbonate-siloxane) comprising bisphenol A carbonate units, and siloxane units of the formula

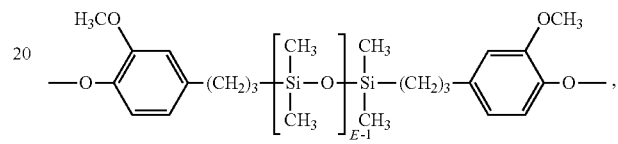

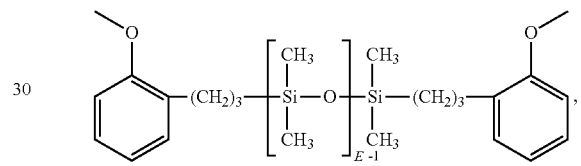

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); wherein no or substantially no brominated polycarbonate is present in the composition; wherein an article molded from each of the polycarbonate copolymer and the poly(carbonate-siloxane) has a smoke density after 4 minutes (DS-4) of greater than 600 determined according to ISO 5659-2 on a 3 mm thick plaque at 50 kW/m²; and wherein an article molded from the composition comprising the polycarbonate copolymer and the poly(carbonate-siloxane) has a smoke density after 4 minutes (DS-4) of less than or equal to 480 determined according to ISO 5659-2 on a 3 mm thick plaque at 50 kW/m².

In another embodiment, a composition comprises, based on the weight of the composition, 70 to 99 wt. % of a poly(bisphenol A carbonate)-co-(bisphenol phthalate ester) comprising 75 to 85 wt. % of the ester units, wherein the ester units have a molar ratio of isophthalate to terephthalate of 98:2 to 88:12; and 1 to 30 wt. % of a poly(carbonate-siloxane) comprising bisphenol A carbonate units, and siloxane units of the formula

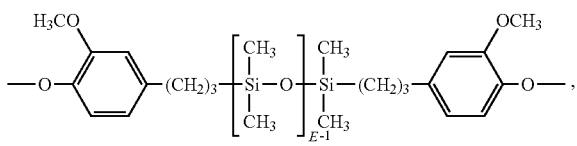

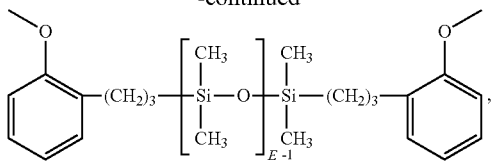

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); wherein an article molded from each of the poly(bisphenol A carbonate)-co-(bisphenol phthalate ester) or the poly(carbonate-siloxane) has a smoke density after 4 minutes (DS-4) of greater than 900 determined according to ISO 5659-2 on a 3 mm thick plaque at 50 kW/m$^2$; and wherein an article molded from the composition comprising the poly(bisphenol A carbonate)-co-(bisphenol phthalate ester) and the poly(carbonate-siloxane) has a smoke density after 4 minutes (DS-4) of less than or equal to 480 determined according to ISO 5659-2 on a 3 mm thick plaque at 50 kW/m$^2$.

In another embodiment, a composition comprises, based on the weight of the composition, 95 to 99.5 wt. % of a poly(bisphenol A carbonate)-co-(bisphenol phthalate ester) comprising 75 to 85 wt. % of the ester units, wherein the ester units have a molar ratio of isophthalate to terephthalate of 98:2 to 88:12; and 0.5 to 5 wt. % of polydimethylsiloxane; wherein an article molded from the poly(bisphenol A carbonate)-co-(bisphenol phthalate ester) has a smoke density after 4 minutes (DS-4) of greater than 900 determined according to ISO 5659-2 on a 3 mm thick plaque at 50 kW/m$^2$; and wherein an article molded from the composition comprising the poly(bisphenol A carbonate)-co-(bisphenol phthalate ester) and the polydimethyl siloxane has a smoke density after 4 minutes (DS-4) of less than or equal to 480 determined according to ISO 5659-2 on a 3 mm thick plaque at 50 kW/m$^2$.

In another embodiment, a composition comprises, based on the weight of the composition, 50 to 93 wt. % of a poly(bisphenol A carbonate)-co-(bisphenol phthalate ester) comprising 75 to 85 wt. % of the ester units, wherein the ester units have a molar ratio of isophthalate to terephthalate of 98:2 to 88:12; 4 to 30 wt. % of a poly(carbonate-siloxane) comprising bisphenol A carbonate units, and siloxane units of the formula

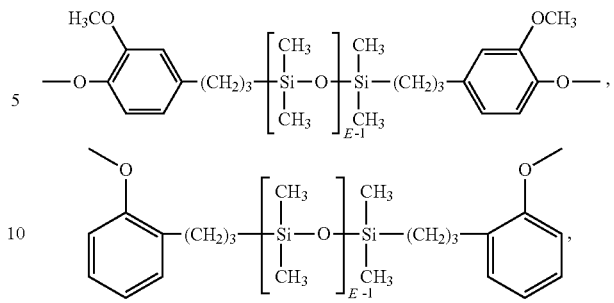

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); and 3 to 20 wt. % of bisphenol A bis(diphenyl phosphate); wherein an article molded from each of the poly(bisphenol A carbonate)-co-(bisphenol phthalate ester) or the poly(carbonate-siloxane) has a smoke density after 4 minutes (DS-4) of greater than 900 determined according to ISO 5659-2 on a 3 mm thick plaque at 50 kW/m$^2$; and wherein an article molded from the composition has a smoke density after 4 minutes (DS-4) of less than or equal to 300 determined according to ISO 5659-2 on a 3 mm thick plaque at 50 kW/m$^2$, and a maximum average heat release (MAHRE) of less than or equal to 90 kW/m$^2$ determined according to ISO 5660-1 on a 3 mm thick plaque at 50 kW/m$^2$.

In another embodiment, a composition comprises, based on the weight of the composition, 45 to 92 wt. % of a polycarbonate copolymer comprising bisphenol A carbonate units, and units of the formula

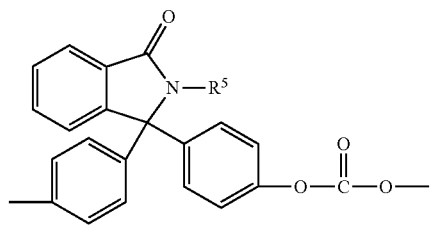

wherein R$^5$ is hydrogen, phenyl optionally substituted with 1 to 5 C$_{1-6}$ alkyl groups, or C$_{1-4}$ alkyl; 5 to 35 wt. % of a poly(carbonate-siloxane) comprising bisphenol A carbonate units, and siloxane units of the formula

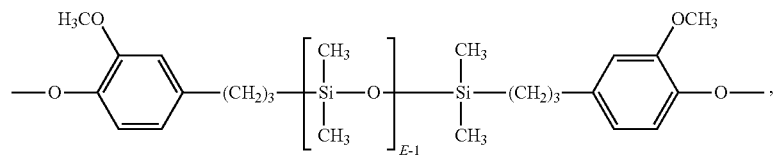

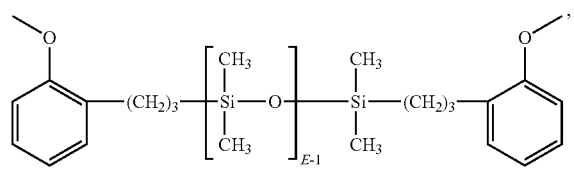

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); and 3 to 20 wt. % of bisphenol A bis(diphenyl phosphate); wherein an article molded from each of the polycarbonate copolymer and the poly(carbonate-siloxane) has a smoke density after 4 minutes (DS-4) of greater than 600 determined according to ISO 5659-2 on a 3 mm thick plaque at 50 kW/m$^2$; and wherein an article molded from the composition comprising the polycarbonate copolymer, the poly(carbonate-siloxane), and the bisphenol A bis(diphenyl phosphate) has a smoke density after 4 minutes (DS-4) of less than or equal to 300 determined according to ISO 5659-2 on a 3 mm thick plaque at 50 kW/m$^2$, and a maximum average heat release (MAHRE) of less than or equal to 90 kW/m$^2$ determined according to ISO 5660-1 on a 3 mm thick plaque at 50 kW/m$^2$.

In still another embodiment, an article can be made from the above-described compositions.

In yet another embodiment, a method of manufacture of an article comprises molding, extruding, or shaping the above-described composition to form the article.

BRIEF DESCRIPTION OF THE DRAWINGS

A description of the figures, which are meant to be exemplary and not limiting, is provided in which.

Figure 1:
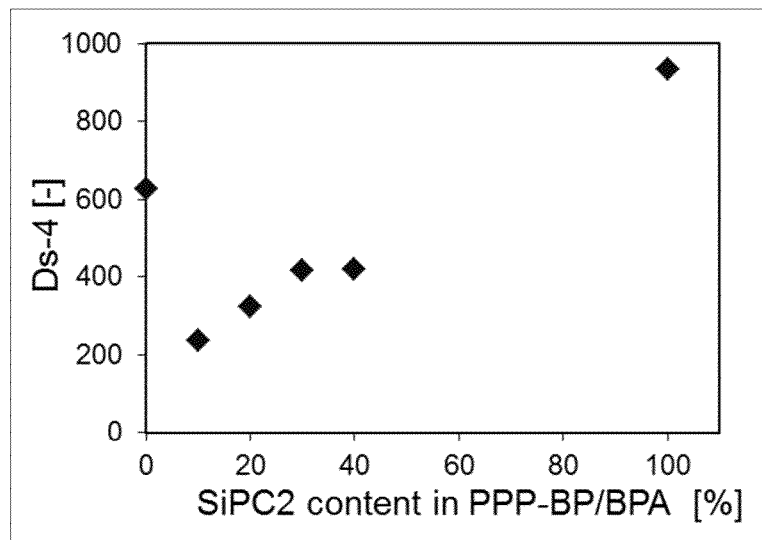
FIG. 1 shows the effect of the SiPC2 content in PPP-BP/BPA on smoke density (Ds-4)

The above described and other features are exemplified by the following detailed description and Examples.

DETAILED DESCRIPTION

The inventors hereof have discovered that polycarbonate compositions having very low smoke density can unexpectedly be obtained by combining certain polycarbonate polymers with a small amount of a poly(carbonate-siloxane) copolymer, a polydialkylsiloxane, or a combination comprising at least one of the foregoing. In particular, the inventors have discovered that the addition of the small amount of poly(carbonate-siloxane) copolymer, a polydialkylsiloxane, or a combination comprising at least one of the foregoing to polycarbonate polymers having a limited oxygen index of greater than 26% results in a significant decrease in the smoke density (Ds-4) of the polycarbonate polymers as determined in accordance with ISO 5659-2.

The results are particularly surprising because neither polycarbonate polymers alone nor poly(carbonate-siloxane) copolymers alone have a good performance in the ISO5659 smoke density test. For example, most polycarbonate polymers having a limited oxygen index of greater than 26% themselves have DS-4 values far exceeding 480 determined according to ISO 5659-2 on a 3 mm thick plaque at 50 kW/m$^2$, and poly(carbonate-siloxane) copolymers and polydialkylsiloxanes can have DS-4 values greater than 1,000 determined according to ISO 5659-2 on a 3 mm thick plaque at 50 kW/m$^2$. However, the combination of the polycarbonate polymer and the poly(carbonate-siloxane) copolymer, polydialkylsiloxane, or a combination comprising at least one of the foregoing are combined, results in a composition having DS-4 values below 300 or 480 as determined in accordance with ISO 5659-2 on a 3 mm thick plaque at 50 kW/m$^2$. The compositions can also have low heat release with MAHRE values below 90 as determined in accordance with ISO 5660-1 on a 3 mm thick plaque at 50 kW/m$^2$.

Furthermore, the results are surprising because it is discovered that only polysiloxanes with alkyl siloxane groups, for example, polydimethylsiloxane, are capable of reducing smoke density of a polycarbonate polymer, whereas polysiloxanes containing phenyl siloxane units (only phenyl siloxane or combined with alkyl siloxane) are even detrimental for smoke density. This is highly unexpected, as for other flame properties, such as UL V-0 compliance, the siloxane of choice is typically phenyl based siloxane such as octaphenylcyclotetrasiloxane or polyphenylmethylsiloxane rather than polydialkylsiloxanes such as polydimethylsiloxane.

With this discovery, it is now possible to manufacture flame retardant compositions having very low smoke densities (Ds-4) determined according to ISO5659-2 on 3 mm thick samples at 50 kW/m$^2$ and low heat release (MAHRE) determined according to ISO 5660-1 on 3 mm thick samples at 50 kW/m$^2$.

The polycarbonate compositions can further have excellent impact strength. The polycarbonate compositions can also be formulated to have low melt viscosities, which renders them suitable for injection molding. The compositions can further have very low haze. Such compositions are especially useful in the manufacture of large, low smoke, low heat release polycarbonate parts that can be used, for example, in the manufacture of components in aircraft, train, marine, or other mass transportation applications, as well as components in high occupancy, low supervision structures.

In particular, the polycarbonate compositions contain a first polycarbonate having a limited oxygen index of greater than 26% and a second polymer different from the first polycarbonate, the second polymer comprising a poly(carbonate-siloxane) copolymer, a polydialkylsiloxane, or a combination comprising at least one of the foregoing, wherein an article molded from the first polycarbonate has a smoke density after 4 minutes (DS-4) of greater than 600 determined according to ISO 5659-2 on a 3 mm thick plaque at 50 kW/m$^2$; an article molded from the second polymer has a smoke density after 4 minutes (DS-4) of greater than 600 determined according to ISO 5659-2 on a 3 mm thick plaque at 50 kW/m$^2$; and an article molded from the composition has a smoke density after 4 minutes (DS-4) of smaller than 480 determined according to ISO 5659-2 on a 3 mm thick plaque at 50 kW/m$^2$. More specifically, smoke density values of smaller than 300 determined according to ISO 5659-2 at 50 kW/m$^2$ are obtained. "Limited Oxygen Index" (LOI) is determined in accordance with ISO 4589 unless otherwise specified.

As used herein, the term "polycarbonate" and "polycarbonate polymer" refers to compounds having first repeating first units that are bisphenol carbonate units of formula (1)

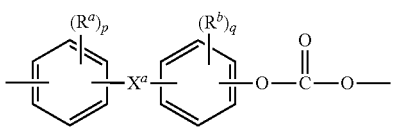

(1)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. Exemplary $X^a$ groups include methylene, ethylidene, neopentylidene, and isopropylidene. The bridging group $X^a$ and the carbonate oxygen atoms of each $C_6$ arylene group can be disposed ortho, meta, or para (specifically para) to each other on the $C_6$ arylene group.

In a specific embodiment, $R^a$ and $R^b$ are each independently a $C_{1-3}$ alkyl group, p and q are each independently 0 to 1, and $X^a$ is a single bond, —O—, —S(O)—, —S(O)$_2$—, —C(O)—, a $C_{1-9}$ alkylidene of formula —C($R^c$)($R^d$)— wherein $R^c$ and $R^d$ are each independently hydrogen or $C_{1-8}$ alkyl, or a group of the formula —C(=$R^e$)— wherein $R^e$ is a divalent $C_{1-9}$ hydrocarbon group. In another specific embodiment, $R^a$ and $R^b$ are each independently a methyl group, p and q are each independently 0 to 1, and $X^a$ is a single bond, a $C_{1-7}$ alkylidene of formula —C($R^c$)($R^d$)— wherein $R^c$ and $R^d$ are each independently hydrogen or $C_{1-6}$ alkyl. In an embodiment, p and q is each 1, and $R^a$ and $R^b$ are each a $C_{1-3}$ alkyl group, specifically methyl, disposed meta to the oxygen on each ring. The bisphenol carbonate units (1) can be derived from bisphenol A, where p and q are both 0 and $X^a$ is isopropylidene.

The polycarbonate units in the copolymers can be produced from dihydroxy compounds of the formula (2)

HO—$R^1$—OH (2)

wherein $R^1$ is a bridging moiety. Thus, the bisphenol carbonate units (1) are generally produced from the corresponding bisphenol compounds of formula (3)

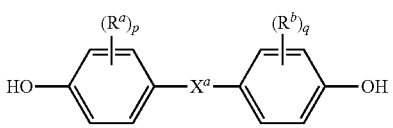

(3)

wherein $R^a$ and $R^b$, p and q, and $X^a$ are the same as in formula (1).

Some illustrative examples of specific bisphenol compounds that can be used to produce units (1) include 4,4'-dihydroxybiphenyl, bis(4-hydroxyphenyl)methane, 1,2-bis(4-hydroxyphenyl)ethane, 2-(4-hydroxyphenyl)-2-(3-hydroxyphenyl)propane, 1,2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, bis(4-hydroxyphenyl)ether, bis(4-hydroxyphenyl)sulfide, bis(4-hydroxyphenyl)sulfoxide, bis(4-hydroxyphenyl)sulfone, or a combination comprising at least one of the foregoing bisphenolic compounds.

Specific examples of bisphenol compounds that can be used in the production of bisphenol carbonate units (1) include 1,1-bis(4-hydroxyphenyl)methane, 1,1-bis(4-hydroxyphenyl)ethane, 2,2-bis(4-hydroxyphenyl)propane ("bisphenol A" or "BPA"), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-2-methylphenyl)propane, 1,1-bis(4-hydroxy-t-butylphenyl)propane, and combinations comprising at least one of the foregoing bisphenol compounds.

The polycarbonate polymer can be a copolymer that further comprises second repeating units. The second repeating units can be bisphenol carbonate units (provided that they are different from the bisphenol carbonate units (1)), or arylate ester units. In particular, the second units can be bisphenol carbonate units of formula (4)

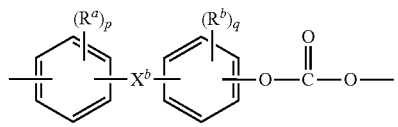

(4)

wherein $R^a$ and $R^b$ are each independently $C_{1-12}$ alkenyl, $C_{3-8}$ cycloalkyl, or $C_{1-12}$ alkoxy, p and q are each independently integers of 0 to 4, and $X^b$ is $C_{2-32}$ bridging hydrocarbon group that is not the same as the r in the polycarbonate copolymer. The bridging group $X^b$ and the carbonate oxygen atoms of each $C_6$ arylene group can be disposed ortho, meta, or para (specifically para) to each other on the $C_6$ arylene group.

In an embodiment, $X^b$ is a substituted or unsubstituted $C_{3-18}$ cycloalkylidene, a substituted or unsubstituted $C_{3-18}$ cycloalkylene, a substituted or unsubstituted $C_{12-25}$ alkylidene of formula —C($R^c$)($R^d$)— wherein $R^c$ and $R^d$ are each independently hydrogen, $C_{1-24}$ alkyl, $C_{4-12}$ cycloalkyl, $C_{6-12}$ aryl, $C_{7-12}$ arylalkylene, $C_{1-12}$ heteroalkyl, or cyclic $C_{7-12}$ heteroarylalkyl, or a group of the formula —C(=$R^e$)— wherein $R^e$ is a divalent $C_{12-31}$ hydrocarbon group. Exemplary $X^b$ groups include cyclohexylmethylidene, 1,1-ethene, 2-[2.2.1]-bicycloheptylidene, cyclohexylidene, cyclopentylidene, cyclododecylidene, and adamantylidene.

In an embodiment, $X^b$ is a substituted or unsubstituted $C_{5-32}$ alkylidene of formula —C($R^c$)($R^d$)— wherein $R^c$ and $R^d$ are each independently hydrogen, $C_{4-12}$ cycloalkyl, $C_{6-12}$ aryl, $C_{7-12}$ arylalkylene, $C_{1-12}$ heteroalkyl, a substituted or unsubstituted group of the formula —C(=$R^e$)— wherein $R^e$ is a divalent $C_{12-31}$ hydrocarbyl, a substituted or unsubstituted $C_{5-18}$ cycloalkylidene, a substituted or unsubstituted $C_{5-18}$ cycloalkylene, a substituted or unsubstituted $C_{3-18}$ heterocycloalkylidene, or a group of the formula —$B^1$-G-$B^2$— wherein $B^1$ and $B^2$ are the same or different $C_{1-6}$ alkylene group and G is a $C_{3-12}$ cycloalkylidene group or a $C_{6-16}$ arylene group.

For example, $X^b$ can be a substituted $C_{3-18}$ heterocycloalkylidene of formula (4a)

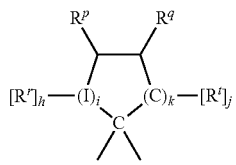

(4a)

wherein $R^r$, $R^p$, $R^q$, and $R^t$ are each independently hydrogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (3) will have an unsaturated carbon-carbon linkage where the ring is fused. When k is one and i is 0, the ring as shown in formula (6) contains 4 carbon atoms, when k is 2, the ring contains 5 carbon atoms, and when k is 3, and the ring contains 6 carbon atoms. In an embodiment, two adjacent groups (e.g., $R^q$ and $R^t$ taken together form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Specific second bisphenol carbonate repeating units of this type are phthalimidine carbonate units of formula (4b)

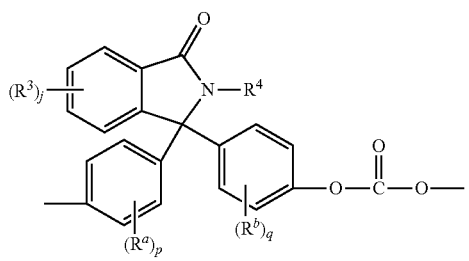

(4b)

wherein $R^a$, $R^b$, p, and q are as in formula (4), $R^3$ is each independently a $C_{1-6}$ alkyl, j is 0 to 4, and $R^4$ is hydrogen, $C_{1-6}$ alkyl, phenyl optionally substituted with 1 to 5 $C_{1-6}$ alkyl groups. In an embodiment, $R^a$ and $R^b$ are each independently $C_{1-3}$ alkyl. For example, the phthalimidine carbonate units are of formula (4c)

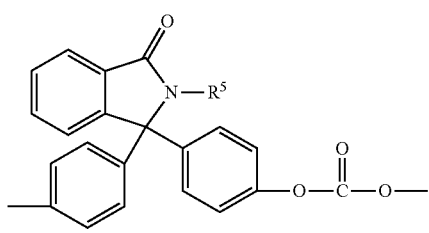

(4c)

wherein $R^5$ is hydrogen, phenyl optionally substituted with up to five $C_{1-6}$ alkyl groups, or $C_{1-4}$ alkyl. In an embodiment, $R^5$ is hydrogen, phenyl, or methyl. Carbonate units (4c) wherein $R^5$ is phenyl can be derived from 2-phenyl-3,3'-bis (4-hydroxy phenyl)phthalimidine (also known as N-phenyl phenolphthalein bisphenol, or "PPP-BP") (also known as 3,3-bis(4-hydroxyphenyl)-2-phenylisoindolin-1-one).

Other bisphenol carbonate repeating units of this type are the isatin carbonate units of formula (4d) and (4e)

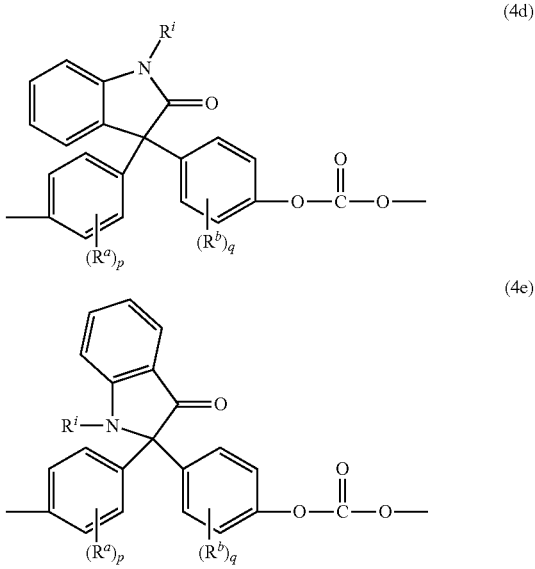

wherein $R^a$ and $R^b$ are each independently $C_{1-12}$ alkyl, p and q are each independently 0 to 4, and $R^i$ is $C_{1-12}$ alkyl, phenyl optionally substituted with 1 to 4 $C_{1-10}$ alkyl groups, or benzyl optionally substituted with 1 to 5 $C_{1-10}$ alkyl groups. In an embodiment, $R^a$ and $R^b$ are each methyl, p and q are each independently 0 or 1, and $R^i$ is $C_{1-4}$ alkyl or phenyl.

Examples of bisphenol carbonate units (4) wherein $X^b$ is a substituted or unsubstituted $C_{3-18}$ cycloalkylidene include the cyclohexylidene-bridged, alkyl-substituted bisphenol of formula (4f)

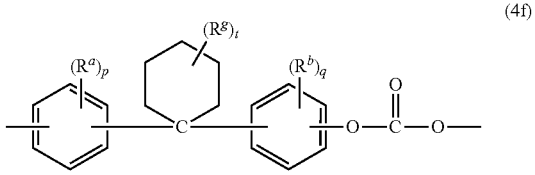

(4f)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, r and s are each 0 or 1, and t is 0 or 3, specifically 0.

Examples of other bisphenol carbonate units (4) is a substituted or unsubstituted $C_{3-18}$ cycloalkylidene include adamantyl units of formula (4g) and fluorenyl units of formula (4h)

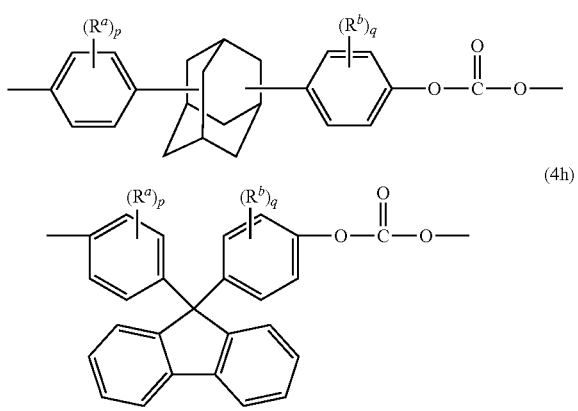

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1; specifically, $R^a$, $R^b$ are each methyl, p and q are each 0 or 1, and when p and q are 1, the methyl group is disposed meta to the cycloalkylidene bridging group. Carbonates containing units (4a) to (4g) are useful for making polycarbonates with high glass transition temperatures (Tg) and high heat distortion temperatures.

Bisphenol carbonate units (4) are generally produced from the corresponding bisphenol compounds of formula (5)

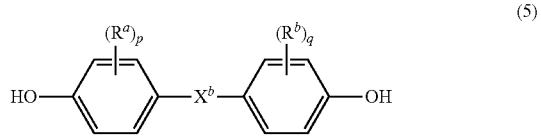

wherein $R^a$, $R^b$, p, q, and $X^b$ are the same as in formula (4).

Specific examples of bisphenol compounds of formula (5) include bis(4-hydroxyphenyl)diphenylmethane, 1,1-bis(4-hydroxy-t-butylphenyl)propane, 1,6-dihydroxynaphthalene, 2,6-dihydroxynaphthalene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathiin, 2,7-dihydroxy-9,10-dimethylphenazine, 3,6-dihydroxydibenzofuran, 3,6-dihydroxydibenzothiophene, 2,7-dihydroxycarbazole, and 2,6-dihydroxythianthrene 3,3-bis(4-hydroxyphenyl)phthalimidine, 2-phenyl-3,3-bis(4-hydroxyphenyl)phthalimidine (PPP-BP), and 1,1-bis(4-hydroxy-3-methylphenyl)cyclohexane (DMBPC). Combinations comprising at least one of the foregoing dihydroxy compounds can also be used.

The relative mole ratio of first bisphenol carbonate units (1) and second bisphenol carbonate units (4) can vary from 99:1 to 1:99, depending on the desired characteristics of the polycarbonate composition, including glass transition temperature ("Tg"), impact strength, ductility, flow, and like considerations. For example, the mole ratio of units (1): units (4) can be from 90:10 to 10:90, from 80:20 to 20:80, from 70:30 to 30:70, or from 60:40 to 40:60. When bisphenol carbonate units (1) are derived from bisphenol A, the bisphenol A units are generally present in an amount from 50 to 99 mole %, based on the total moles of units in the polycarbonate copolymer. For example, when bisphenol carbonate units (1) are derived from bisphenol A, and bisphenol units (4) are derived from PPP-BP, the mole ration of units (1) to units (4) can be from 99:1 to 50:50, or from 90:10 to 55:45.

Other carbonate units can be present in any of the polycarbonate copolymers described herein in relatively small amounts, for example less than 20 mole %, less than 10 mole %, or less than 5 mole %, based on the total moles of units in the polycarbonate copolymer. The other carbonate units can be derived from aliphatic or aromatic dihydroxy compounds having 1 to 32 carbon atoms, for example 1,6-dihydroxynaphthalene, 2,6-dihydroxynaphthalene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, and 2,6-dihydroxythianthrene. A specific aromatic dihydroxy compound includes the monoaryl dihydroxy compounds of formula (6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine. In an embodiment, no halogens are present. Specific monoaryl dihydroxy compounds (6) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, and the like; catechol; hydroquinone; and substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone. A combination comprising at least one of the foregoing aromatic dihydroxy compounds can be used. In an embodiment, the polycarbonate copolymer comprises carbonate units of formulas (1) and (4), and less than 10 mole % of units derived from monoaryl dihydroxy compounds (6), i.e., monoaryl carbonate units of the formula (6a)

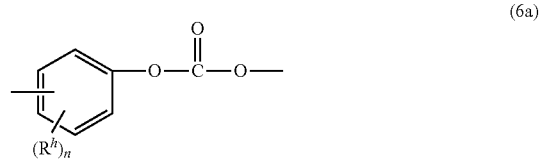

wherein each $R^h$ is independently a halogen or $C_{1-10}$ hydrocarbon group, and n is 0 to 4. Specifically, each $R^h$ is independently a $C_{1-3}$ alkyl group, and n is 0 to 1, or n is 0. In another embodiment, no carbonate units other than units of formulas (1) and (4) are present in the polycarbonate copolymer.

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The water immiscible solvent can be, for example, methylene chloride, 1,2-dichloroethane, chlorobenzene, toluene, and the like.

Exemplary carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction.

Among tertiary amines that can be used are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X^-$, wherein each $R_3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include $(CH_3(CH_2)_3)_4N^+X^-$, $(CH_3(CH_2)_3)_4P^+X^-$, $(CH_3(CH_2)_5)_4N^+X^-$, $(CH_3(CH_2)_6)_4N^+X^-$, $(CH_3(CH_2)_4)_4N^+X$, $CH_3(CH_3(CH_2)_3)_3N^+X^-$, and $CH_3(CH_3(CH_2)_2)_3N^+X^-$, wherein X is Cl⁻, Br⁻, a $C_{1-8}$ alkoxy group or a $C_{6-18}$ aryloxy group. An effective amount of a phase transfer catalyst can be 0.1 to 10 wt. %, or 0.5 to 2 wt. %, each based on the weight of bisphenol in the phosgenation mixture.

Alternatively, melt processes can be used to make the polycarbonates. Melt polymerization may be conducted as a batch process or as a continuous process. In either case, the melt polymerization conditions used may comprise two or more distinct reaction stages, for example, a first reaction stage in which the starting dihydroxy aromatic compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of about 1,000 to about 7,500 Daltons. In one or more subsequent polymerization stages the number average molecular weight (Mn) of the polycarbonate is increased to between about 8,000 and about 25,000 Daltons (using polycarbonate standard).

The term "melt polymerization conditions" is understood to mean those conditions necessary to effect reaction between a dihydroxy aromatic compound and a diaryl carbonate in the presence of a transesterification catalyst. Typically, solvents are not used in the process, and the reactants dihydroxy aromatic compound and the diaryl carbonate are in a molten state. The reaction temperature can be about 100° C. to about 350° C., specifically about 180° C. to about 310° C. The pressure may be at atmospheric pressure, supra-atmospheric pressure, or a range of pressures from atmospheric pressure to about 15 torr in the initial stages of the reaction, and at a reduced pressure at later stages, for example about 0.2 to about 15 torr. The reaction time is generally about 0.1 hours to about 10 hours.

The diaryl carbonate ester can be diphenyl carbonate, or an activated diphenyl carbonate having electron-withdrawing substituents on the aryl groups, such as bis(4-nitrophenyl) carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing.

Catalysts used in the melt polymerization of polycarbonates can include alpha or beta catalysts. Beta catalysts are typically volatile and degrade at elevated temperatures. Beta catalysts are therefore preferred for use at early low-temperature polymerization stages. Alpha catalysts are typically more thermally stable and less volatile than beta catalysts.

The alpha catalyst can comprise a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of a non-volatile inorganic acid such as $NaH_2PO_3$, $NaH_2PO_4$, $Na_2HPO_3$, $KH_2PO_4$, $CsH_2PO_4$, $Cs_2HPO_4$, and the like, or mixed salts of phosphoric acid, such as $NaKHPO_4$, $CsNaHPO_4$, $CsKHPO_4$, and the like. Combinations comprising at least one of any of the foregoing catalysts can be used.

Possible beta catalysts can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used. The quaternary phosphonium compound can be a compound of the structure $(R^5)_4P^+X^-$, wherein each $R^5$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents $2(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used.

The amount of alpha and beta catalyst used can be based upon the total number of moles of dihydroxy compound used in the polymerization reaction. When referring to the ratio of beta catalyst, for example a phosphonium salt, to all dihydroxy compounds used in the polymerization reaction, it is convenient to refer to moles of phosphonium salt per mole of the dihydroxy compound, meaning the number of moles of phosphonium salt divided by the sum of the moles of each individual dihydroxy compound present in the reaction mixture. The alpha catalyst can be used in an amount sufficient to provide $1 \times 10^{-2}$ to $1 \times 10^{-8}$ moles, specifically, $1 \times 10^{-4}$ to $1 \times 10^{-7}$ moles of metal per mole of the dihydroxy compounds used. The amount of beta catalyst (e.g., organic ammonium or phosphonium salts) can be $1 \times 10^{-2}$ to $1 \times 10^{-5}$, specifically $1 \times 10^{-3}$ to $1 \times 10^{-4}$ moles per total mole of the dihydroxy compounds in the reaction mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of about 0.05 to about 5 wt. %. Combinations comprising linear polycarbonates and branched polycarbonates can be used.

All types of polycarbonate end groups are contemplated as being useful in the polycarbonate composition, provided that such end groups do not significantly adversely affect desired properties of the compositions. A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

In an embodiment, the polycarbonate is a branched polycarbonate comprising units as described above; greater than or equal to 3 mole %, based on the total moles of the polycarbonate, of moieties derived from a branching agent; and end-capping groups derived from an end-capping agent having a pKa between about 8.3 and about 11. The branching agent can comprise trimellitic trichloride, 1,1,1-tris(4-hydroxyphenyl)ethane or a combination of trimellitic trichloride and 1,1,1-tris(4-hydroxyphenyl)ethane, and the end-capping agent is phenol or a phenol containing a substituent of cyano group, aliphatic groups, olefinic groups, aromatic groups, halogens, ester groups, ether groups, or a combination comprising at least one of the foregoing. In a specific embodiment, the end-capping agent is phenol, p-t-butylphenol, p-methoxyphenol, p-cyanophenol, p-cumylphenol, or a combination comprising at least one of the foregoing.

The polycarbonate copolymers comprising carbonate units (1) and carbonate units (4) can have an intrinsic viscosity, as determined in chloroform at 25° C., of about 0.3 to about 1.5 deciliters per gram (dl/gm), specifically about 0.45 to about 1.0 dl/gm. The polycarbonate copolymers can have a weight average molecular weight of about 10,000 to about 200,000 g/mol, specifically about 20,000 to about 100,000 g/mol, as measured by gel permeation chromatography (GPC), using a crosslinked styrene-divinylbenzene column and calibrated to polycarbonate references. GPC samples are prepared at a concentration of about 1 mg per ml, and are eluted at a flow rate of about 1.5 ml per minute.

In another embodiment the polycarbonate polymer is a polycarbonate copolymer, in particular a poly(carbonate-arylate ester) containing the first repeating bisphenol carbonate units (1) and repeating arylate ester units of formula (7)

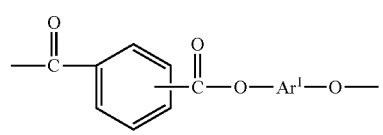

(7)

wherein $Ar^1$ is a $C_{6-32}$ hydrocarbyl group containing at least one aromatic group, e.g., a phenyl, naphthalene, anthracene, or the like. In an embodiment, $Ar^1$ is derived from an aromatic bisphenol as described above in connection with units (1) and (4), a monoaryl dihydroxy compound (6), or a combination comprising different bisphenol or monoaryl dihydroxy compounds. Thus, arylate ester units (7) can be derived by reaction of isophthalic acid, terephthalic acid, or a combination thereof (referred to herein as a "phthalic acid"), with any of the aromatic bisphenols described above, a monoaryl dihydroxy compound (6), or a combination thereof. The molar ratio of isophthalate to terephthalate can be 1:99 to 99:1, or 80:20 to 20:80, or 60:40 to 40:60.

The poly(carbonate-arylate ester) comprising first bisphenol carbonate units (1) and arylate ester units (7) can be alternating or block copolymers of formula (8)

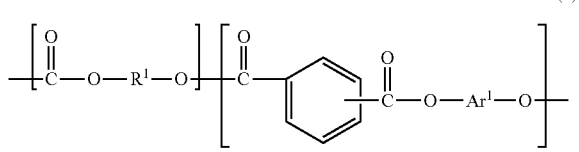

(8)

wherein $R^1$ and $Ar^1$ are as defined in formulae (1) and (7), respectively.

In general, the copolymers are block copolymers containing carbonate blocks and ester blocks. The weight ratio of total ester units to total carbonate units in the copolymers can vary broadly, for example from 99:1 to 1:99, or from 95:5 to 5:95, specifically from 90:10 to 10:90, or more specifically from 90:10 to 50:50, depending on the desired properties of the polycarbonate composition. The molar ratio of isophthalate to terephthalate in the ester units of the copolymers can also vary broadly, for example from 0:100 to 100:0, or from 92:8 to 8:92, more specifically from 98:2 to 45:55, depending on the desired properties of the polycarbonate composition. For example, the weight ratio of total ester units to total carbonate can be 99:1 to 40:60, or 90:10 to 50:40, wherein the molar ratio of isophthalate to terephthalate is from 99:1 to 40:50, more specifically 98:2 to 45:55, depending on the desired properties of the polycarbonate composition.

Additional carbonate units derived from the dihydroxy compound used to form the arylate ester units (7) can also be present as described above, for example in amounts of less than 20 mole %, less than 10 mole %, or less than 5 mole %, based on the total moles of units in the polycarbonate copolymer. It is also possible to have additional arylate ester units present derived from reaction of the phthalic acid with the dihydroxy compound used to form the carbonate units, for example in amounts of less than 20 mole %, less than 10 mole %, less than 5 mole %, or less than 1 mole % based on the total moles of units in the copolymer. In an embodiment, the combination of such additional carbonate units and such additional arylate ester units are present in an amount of less than 20 mole %, less than 10 mole %, less than 5 mole %, or less than 1 mole % based on the total moles of units in the copolymer.

A specific poly(carbonate-arylate ester) is a poly(carbonate)-co-(bisphenol arylate ester) comprising carbonate units (1), specifically bisphenol carbonate units, even more specifically bisphenol A carbonate units and repeating bisphenol arylate ester units. Bisphenol arylate units comprise residues of phthalic acid and a bisphenol, for example a bisphenol (2). In an embodiment the bisphenol arylate ester units are of formula (7a)

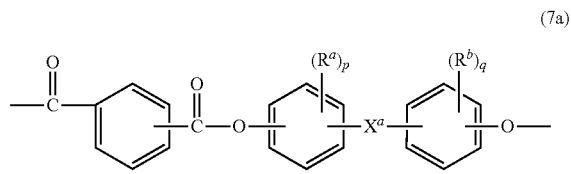

(7a)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. In an embodiment, p and q is each 0 or 1, and $R^a$ and $R^b$ are each a $C_{1-3}$ alkyl group, specifically methyl, disposed meta to the oxygen on each ring, and $X^a$ is an alkylidene of the formula —C($R^c$)($R^d$)— wherein $R^c$ and $R^d$ are each $C_{1-6}$ alky. The bisphenol can be bisphenol A, where p and q are both 0 and $X^a$ is isopropylidene.

In a specific embodiment, the polycarbonate copolymer is a poly(bisphenol A carbonate)-co-(bisphenol A-phthalate-ester) of formula (8a)

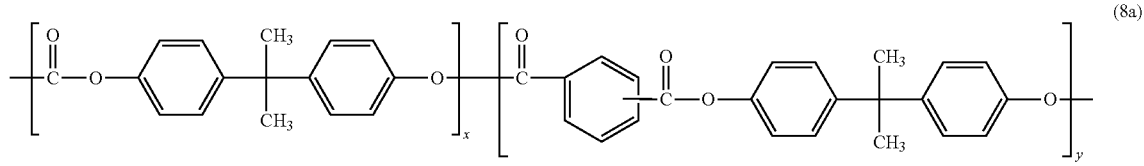

(8a)

wherein y and x represent the weight percent of arylate-bisphenol A ester units and bisphenol A carbonate units, respectively. Generally, the units are present as blocks. In an embodiment, the weight percent of ester units y to carbonate units x in the copolymers is 50:50 to 99:1, or 55:45 to 90:10, or 75:25 to 95:5. Copolymers of formula (8a) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE) and copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC).

In another embodiment, a specific polycarbonate copolymer is a poly(carbonate)-co-(monoaryl arylate ester) containing carbonate units (1) and repeating monoaryl arylate ester units of formula (7b)

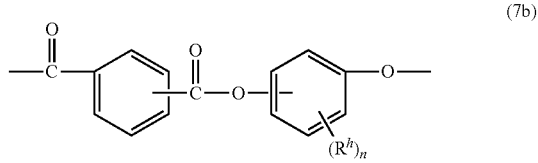

(7b)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Specifically, each $R^h$ is independently a $C_{1-4}$ alkyl, and n is 0 to 3, 0 to 1, or 0. These poly(carbonate)-co-(monoaryl arylate ester) copolymers are of formula (8b)

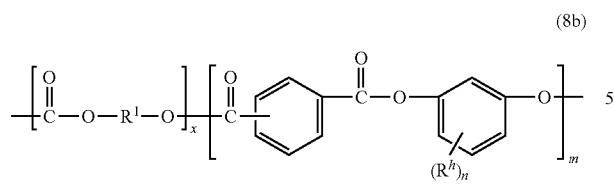

(8b)

wherein $R^1$ is as defined in formula (1) and $R^h$, and n are as defined in formula (7b), and the mole ratio of x:m is 99:1 to 1:99, specifically 80:20 to 20:80, or 60:40 to 40:60.

Specifically, the monoaryl-arylate ester unit (7b) is derived from the reaction of a combination of isophthalic and terephthalic diacids (or derivatives thereof) with resorcinol (or reactive derivatives thereof) to provide isophthalate-terephthalate-resorcinol ("ITR" ester units) of formula (7c)

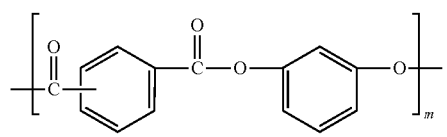

(7c)

wherein m is 4 to 100, 4 to 90, 5 to 70, more specifically 5 to 50, or still more specifically 10 to 30. In an embodiment, the ITR ester units are present in the polycarbonate copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

A specific example of a poly(carbonate)-co-(monoaryl arylate ester) is a poly(bisphenol A carbonate)-co-(isophthalate-terephthalate-resorcinol ester) of formula (8c)

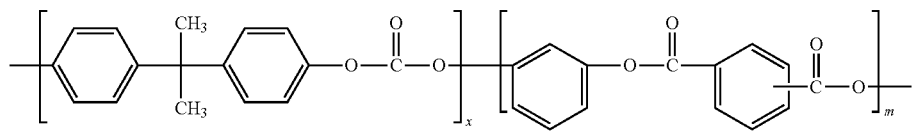

(8c)

wherein m is 4 to 100, 4 to 90, 5 to 70, more specifically 5 to 50, or still more specifically 10 to 30, and the mole ratio of x:n is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination thereof can be present, in a total amount of 1 to 20 mole % based on the total moles of units in the copolymers, for example resorcinol carbonate units of formula (20) and bisphenol ester units of formula (7a):

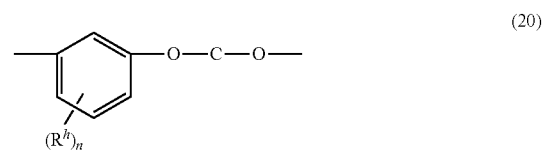

(20)

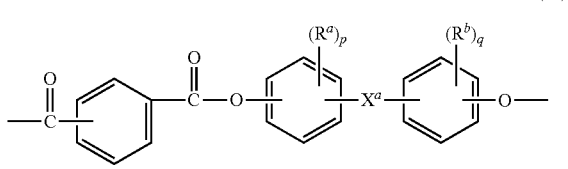

(7a)

wherein, in the foregoing formulae, $R^h$ is each independently a $C_{1-10}$ hydrocarbon group, n is 0 to 4, $R^a$ and $R^b$ are each independently a $C_{1-12}$ alkyl, p and q are each independently integers of 0 to 4, and $X^a$ is a single bond, —O—, —S—, —S(O)—, —S(O)$_2$—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group. The bisphenol ester units can be bisphenol A phthalate ester units of the formula

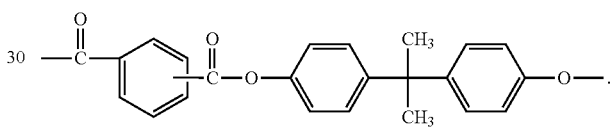

In an embodiment, poly(bisphenol A carbonate)-co-(isophthalate-terephthalate-resorcinol ester) (8c) comprises 1 to 20 mol % of bisphenol A carbonate units, 20-98 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination thereof.

The polycarbonate copolymers comprising arylate ester units are generally prepared from polyester blocks. The polyester blocks can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used. The polyesters can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

The polycarbonate copolymers comprising arylate ester units can have an $M_w$ of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a cross linked styrene-divinyl benzene column, at a sample concentration of 1 milligram per milliliter, and as calibrated with polycarbonate standards. Samples are eluted at a flow rate of about 1.0 ml/min with methylene chloride as the eluent.

The low smoke density polycarbonate compositions comprise the above-described polycarbonate polymers and a second polymer comprising a poly(carbonate-siloxane) copolymer, a polydialkylsiloxane, or a combination comprising at least one of the foregoing.

The polydialkylsiloxanes are silicone oils of low volatility, for example silicone oils with a viscosity of from 10 millipascal-second (mPa-s, also known as centipoise, cps) to 100,000,000 mPa-s at 25° C. are preferable, and silicone oils with a viscosity of from 20 mPa-s to 10,000,000 mPa-s at 25° C. Examples of such silicone oils include oils having linear, partially branched linear, cyclic, or branched molecular structures, with oils having linear or cyclic structures being specifically mentioned. The silicone oils have no, or substantially no reactive groups, for example no alkenyl groups, no silicon-bonded hydrogen atoms, no silanol groups, and no silicon-bonded hydrolyzable groups. The alkyl groups can be the same or different and can have 1 to 10 carbon atoms, 1 to 6 carbon atoms, or 1 to 3 carbon atoms. In an embodiment, the silicone oil is a polydimethylsiloxane, for example a polydimethylsiloxane having a viscosity from 50 to 1,000 mPa-s at 25° C.

The poly(carbonate-siloxane) copolymers, also referred to as "PC-siloxane," can contain bisphenol carbonate units (1) and repeating siloxane units (also known as "diorganosiloxane units"). The siloxane units can be polysiloxane units of formula (9)

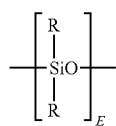

(9)

wherein each R is independently a $C_{1-13}$ monovalent hydrocarbyl group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination thereof. In an embodiment no halogens are present. Combinations of the foregoing R groups can be used in the same copolymer. In an embodiment, the polysiloxane comprises R groups that have minimal hydrocarbon content. In a specific embodiment, an R group with a minimal hydrocarbon content is a methyl group.

The average value of E in formula (9) can vary widely depending on the type and relative amount of each component in the polycarbonate composition, whether the polymer is linear, branched or a graft copolymer, the desired properties of the composition, and like considerations. In an embodiment, E has an average value of 2 to 500, 2 to 200, or 5 to 120, 10 to 100, 10 to 80, 2 to 30, or 30 to 80. In an embodiment E has an average value of 16 to 50, more specifically 20 to 45, and even more specifically 25 to 45. In another embodiment, E has an average value of 4 to 50, 4 to 15, specifically 5 to 15, more specifically 6 to 15, and still more specifically 7 to 10. In an embodiment, the polysiloxane units are structural units of formula (9a)

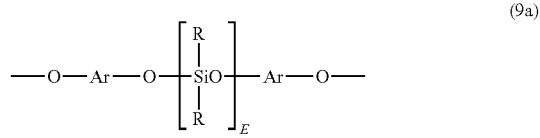

(9a)

wherein E is as defined above; each R can independently be the same or different, and is as defined above; and each Ar can independently be the same or different, and is a substituted or unsubstituted $C_{6-30}$ compound containing an aromatic group, wherein the bonds are directly connected to the aromatic moiety. The Ar groups in formula (9a) can be derived from a $C_{6-30}$ dihydroxy aromatic compound, for example a bisphenol compound as described above or a monoaryl dihydroxy compound (6) above. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used. In an embodiment, the dihydroxy aromatic compound is unsubstituted, or is does not contain non-aromatic hydrocarbyl substituents such as alkyl, alkoxy, or alkylene substituents.

In a specific embodiment, where Ar is derived from resorcinol, the polysiloxane units are of the formula (9a-1)

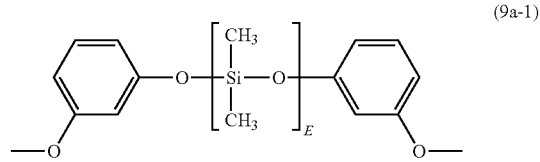

(9a-1)

or, where Ar is derived from bisphenol A, the polysiloxane has the formula (9a-2)

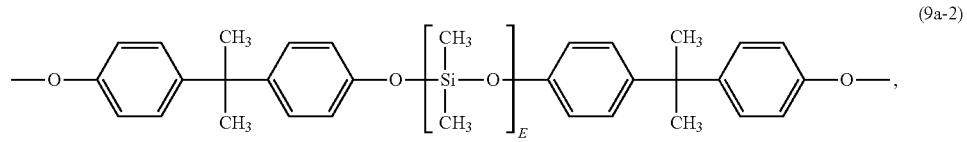

(9a-2)

or a combination comprising at least one of the foregoing can be used, wherein E has an average value as described above, specifically an average value of 2 to 200.

In another embodiment, polydiorganosiloxane units are units of formula (9b)

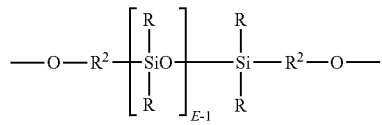
(9b)

wherein R and E are as described for formula (9), and each $R^2$ is independently a divalent $C_{1-30}$ alkylene or $C_{7-30}$ arylene-alkylene. In a specific embodiment, where $R^2$ is $C_{7-30}$ arylene-alkylene, the polydiorganosiloxane units are of formula (9b-1)

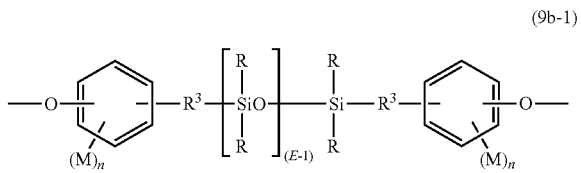
(9b-1)

wherein R and E are as defined for formula (9), and each $R^3$ is independently a divalent $C_{2-8}$ aliphatic group. Each M in formula (25) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

In a specific embodiment, the polysiloxane units are of formula (9b-2)

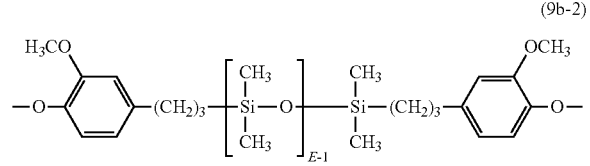
(9b-2)

where E has an average value as described above, specifically 5 to 100, 2 to 30, or 30 to 80. In another specific embodiment, the polysiloxane units are of formula (9b-3)

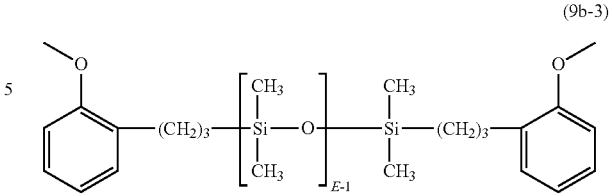
(9b-3)

where E has an average value as defined above, specifically an average value of 5 to 100, 2 to 30, or 30 to 80.

The relative amount of carbonate units (1) and polysiloxane units (9) in the PC-siloxane copolymers depends on the desired properties of the polycarbonate composition, such as impact, smoke density, heat release, and melt viscosity. In particular the polycarbonate copolymer is selected to have an average value of E that provides good impact and/or transparency properties, as well as to provide the desired weight percent of siloxane units in the polycarbonate composition. For example, the polycarbonate copolymers can comprise siloxane units in an amount of 0.1 to 60 weight percent (wt. %), specifically 0.5 to 55 wt. %, or 0.5 to 45 wt. %, based on the total weight of the polymers in the polycarbonate composition, with the proviso that the siloxane units are provided by polysiloxane units covalently bonded in the polymer backbone of the polycarbonate copolymer.

A specific PC-siloxane comprises first carbonate units (1) derived from bisphenol A, and second repeating siloxane units (9b-2), (9b-3), or a combination thereof. This polycarbonate copolymer can comprise the siloxane units in an amount of 0.1 to 60 weight percent (wt. %), 0.5 to 55 wt. %, 0.5 to 45 wt. % 0.5 to 30 wt. %, or 0.5 to 20 wt. %, based on the total weight of the polycarbonate copolymer, with the proviso that the siloxane units are covalently bound to the polymer backbone of the polycarbonate copolymer. In an embodiment, the remaining units are bisphenol units (1).

Methods for the manufacture of the PC-siloxane copolymers are known. The PC-siloxane copolymers can have an intrinsic viscosity, as determined in chloroform at 25° C., of 0.3 to 1.5 deciliters per gram (dl/g), specifically 0.45 to 1.0 dl/g. The PC-siloxane copolymers can have a weight average molecular weight ($M_w$) of 10,000 to 100,000 g/mol, as measured by gel permeation chromatography (GPC) using a cross linked styrene-divinyl benzene column, at a sample concentration of 1 milligram per milliliter, and as calibrated with polycarbonate standards.

The addition of relatively small amount of PC-siloxane to the above described polycarbonate polymers reduces the smoke density DS-4 values significantly. Similar improvements in DS-4 values can be achieved at the same silicon content irrespective of the architecture of the PC-siloxane. Further, the length of the siloxane block does not have a significant influence on the smoke density when compared at the same silicon content in the polycarbonate composition. In an embodiment, the PC-siloxane is present in an amount effective to provide 0.1 wt. % to 1.00 wt. % of silicon based on the total weight of the composition.

In an embodiment, the low smoke polycarbonate compositions do not contain or substantially free of any brominated polycarbonate. As used herein, "substantially free of" refers to a composition containing less than 5 wt. %, specifically less than 1 wt. %, more specifically less than 0.1 wt. % of a brominated polycarbonate.

The low smoke density polycarbonate composition can further comprise 5 to 30 wt. % of a polyetherimide, based on the total weight of the polycarbonate composition. The polyetherimide is of formula (10)

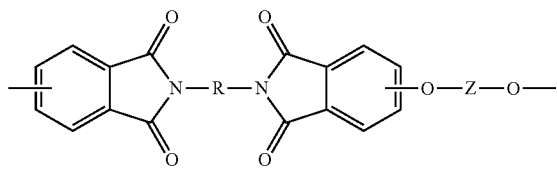
(10)

wherein R is a substituted or unsubstituted divalent organic group having 2 to 20 carbon atoms, for example a substituted or unsubstituted aromatic hydrocarbon group having 6 to 20 carbon atoms or a halogenated derivative thereof, a substituted or unsubstituted, straight or branched chain alkylene group having 2 to 20 carbon atoms, a substituted or unsubstituted cycloalkylene groups having 3 to 20 carbon atoms, or a divalent group of formula (11)

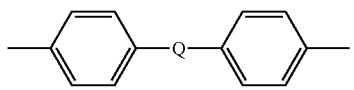
(11)

wherein Q is —O—, —S—, —C(O)—, —SO$_2$—, —SO—, or —C$_y$H$_{2y}$— wherein y is an integer from 1 to 5 or a halogenated derivative thereof.

The group Z in formula (10) is an aromatic C$_{6-24}$ monocyclic or polycyclic group optionally substituted with 1 to 6 C$_{1-8}$ alkyl groups, 1 to 8 halogen atoms, or a combination thereof, wherein the divalent bonds of the —O—Z—O— group are in the 3,3', 3,4', 4,3', or the 4,4' positions.

In an embodiment, R in formula (10) is a divalent radical of one of the following formulas

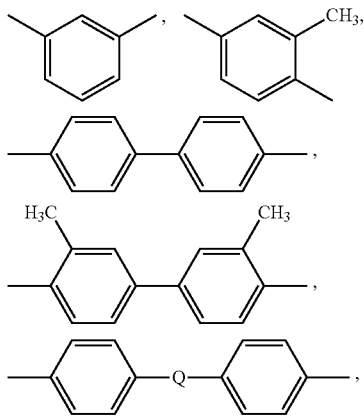
(11a)

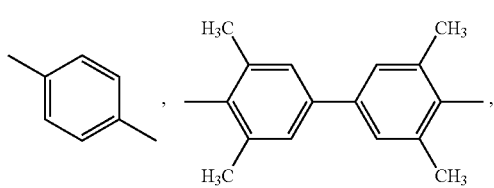

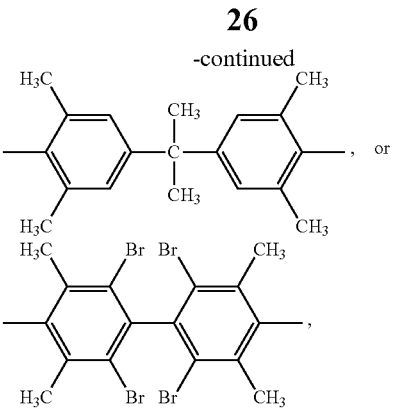
, or wherein Q is —O—, —S—, —C(O)—, —SO$_2$—, —SO—, or —C$_y$H$_{2y}$— wherein y is an integer from 1 to 5 or and a halogenated derivative thereof; and Z is a divalent group of formula (12)

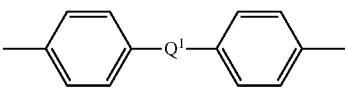
(12)

wherein Q$^1$ is —O—, —S—, —C(O)—, —SO$_2$—, —SO—, or —C$_y$H$_{2y}$— wherein y is an integer from 1 to 5. In an embodiment no halogen substituents are present in the polyetherimide.

Polyetherimides can be obtained by polymerization of an aromatic bisanhydride of formula (13)

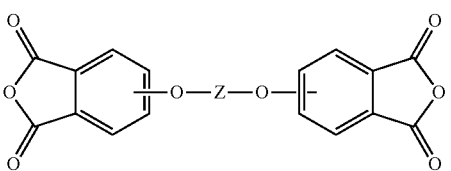
(13)

wherein Z is as described in formula (10), with a diamine of the formula H$_2$N—R—NH$_2$ wherein R is as described in formula (10). Examples of specific aromatic bisanhydrides and organic diamines are disclosed, for example, in U.S. Pat. Nos. 3,972,902 and 4,455,410 incorporated herein by reference in their entirety. Illustrative examples of aromatic bisanhydrides (38) include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures comprising at least one of the foregoing.

Illustrative examples of diamines $H_2N-R-NH_2$ include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2, 2-dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(amino-t-butyl)toluene, bis(p-amino-t-butylphenyl)ether, bis(p-methyl-o-aminophenyl) benzene, bis(p-methyl-o-aminopentyl)benzene, 1,3-diamino-4-isopropylbenzene, bis(4-aminophenyl)sulfide, bis (4-aminophenyl)sulfone, bis(4-aminophenyl)ether and 1,3-bis(3-aminopropyl)tetramethyldisiloxane. Combinations comprising at least one of the foregoing aromatic bisanhydrides can be used. Aromatic diamines are often used, especially m- and p-phenylenediamine, sulfonyl dianiline, and combinations thereof.

The polycarbonate compositions can include various other polymers to adjust the properties of the polycarbonate compositions, with the proviso that the other polymers are selected so as to not adversely affect the desired properties of the polycarbonate composition significantly, in particular low smoke density and low heat release. For example, combination of a polycarbonate copolymer as described above and a homopolycarbonate having repeating units (1) such as a bisphenol A homopolycarbonate can still provide polycarbonate compositions having the required low smoke density. Other polymers include an impact modifier such as natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like can be present. In general such other polymers provide less than 50 wt. %, less than 40 wt. %, less than 30 wt. %, less than 20 wt. %, or less than 10 wt. % of the total composition. In an embodiment, no other polymers are present. In a specific embodiment, no polymers containing halogen are present in the polycarbonate compositions.

The polycarbonate compositions can include various additives ordinarily incorporated into flame retardant compositions having low smoke density and low heat release, with the proviso that the additive(s) are selected so as to not adversely affect the desired properties of the polycarbonate composition significantly, in particular low smoke density and low heat release. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, additional flame retardants, and anti-drip agents. A combination of additives can be used. In general, the additives are used in the amounts generally known to be effective. The total amount of additives (other than any filler or reinforcing agents) is generally 0.01 to 25 parts per hundred parts by the total weight of the polymers in the composition (PHR).

The use of pigments such as titanium dioxide produces white compositions, which are commercially desirable. It has surprisingly been found that the use of titanium dioxide can further improve smoke density and/or heat release properties. Pigments such as titanium dioxide (or other mineral fillers) can be present in the polycarbonate compositions in amounts of 0 to 12 wt. %, 0.1 to 12 wt. %, 0.1 to 9 wt. %, 0.5 to 5 wt. %, or 0.5 to 3 wt. %, each based on the total weight of the composition.

Exemplary antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 PHR.

Exemplary heat stabilizer additives include organophosphites such as triphenyl phosphite, tris-(2,6-dimethylphenyl) phosphite, and tris-(mixed mono- and di-nonylphenyl)phosphite; phosphonates such as dimethylbenzene phosphonate, phosphates such as trimethyl phosphate; or combinations comprising at least one of the foregoing heat stabilizers. Heat stabilizers are used in amounts of 0.01 to 0.1 PHR.

Light stabilizers and/or ultraviolet light (UV) absorbing additives can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 PHR.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1, 3,5-triazin-2-yl]-5-(octyloxy)-phenol (CYASORB® 1164);

2,2'-(1,4-phenylene)bis(4H-3,1-benzoxazin-4-one) (CYASORB® UV-3638); 1,3-bis[[(2-cyano-3,3-diphenylacryloyl)oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to 100 nanometers; or combinations comprising at least one of the foregoing UV absorbers. UV absorbers are used in amounts of 0.01 to 5 PHR.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl) isocyanurate; tristearin; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly (ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 PHR.

Flame retardant salts are not needed to obtain the desired low smoke and low heat release properties. Examples of flame retardant salts include of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate (KSS); salts such as $Na_2CO_3$, $K_2CO_3$, $MgCO_3$, $CaCO_3$, and $BaCO_3$, phosphate salts, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. In an embodiment, no flame retardant salts are present. When present, flame retardant salts are present in amounts of 0.01 to 10 PHR, more specifically 0.02 to 1 PHR.

Organic flame retardants can be present, for example organic compounds that include phosphorus, nitrogen, bromine, and/or chlorine. However, halogenated flame retardants are generally avoided, such that the polycarbonate composition can be essentially free of chlorine and bromine. "Essentially free of chlorine and bromine" as used herein means having a bromine and/or chlorine content of less than or equal to 100 parts per million by weight (ppm), less than or equal to 75 ppm, or less than or equal to 50 ppm, based on the total parts by weight of the composition, excluding any filler.

In certain embodiments the polycarbonate compositions can further comprise an organophosphorus flame retardant in an amount effective to provide 0.1 to 2.0 wt. % phosphorus, based on the weight of the composition. For example, the organophosphorus compound, specifically BPADP or RDP can be present in an amount of 2 to 20 wt. %, which is effective to provide 0.1 to 2.0 wt. % phosphorus based on the total weight of the composition. Inventors have found that the presence of certain organophosphorus flame retardants for example BPADP, has a positive effect on the smoke density as it further reduced DS-values of a composition containing a polycarbonate polymer and a second polymer, but not the flame retardant. Further, it was found that these flame retardants have a positive effect on MAHRE, as they reduce MAHRE of a composition containing a polycarbonate polymer and a second polymer but not the flame retardants. Further, certain organophosphorus flame retardants improve the melt flow while at the same time maintain ductility even at relatively high loading levels.

Organophosphorus compounds include aromatic organophosphorus compounds having at least one organic aromatic group and at least one phosphorus-containing group, as well as organic compounds having at least one phosphorus-nitrogen bond.

In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more non-aromatic moieties, for example alkyl, alkenyl, alkynyl, or cycloalkyl. The aromatic moiety of the aromatic group can be directly bonded to the phosphorus-containing group, or bonded via another moiety, for example an alkylene group. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol A), a monoarylene group (e.g., a 1,3-phenylene or a 1,4-phenylene), or a combination comprising at least one of the foregoing.

The phosphorus-containing group can be a phosphate $(P(=O)(OR)_3)$, phosphite $(P(OR)_3)$, phosphonate $(RP(=O)(OR)_2)$, phosphinate $(R_2P(=O)(OR))$, phosphine oxide $(R_3P(=O))$, or phosphine $(R_3P)$, wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula $(GO)_3P=O$, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl) phosphate, phenyl bis (neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2, 5,5'-trimethylhexyl) phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of formula (14)

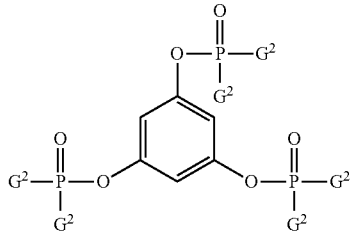

(14)

wherein each G² is independently a hydrocarbon or hydrocarbonoxy having 1 to 30 carbon atoms. In some embodiments G corresponds to a monomer used to form the polycarbonate, e.g., resorcinol.

Specific aromatic organophosphorus compounds have two or more phosphorus-containing groups, and are inclusive of acid esters of formula (15)

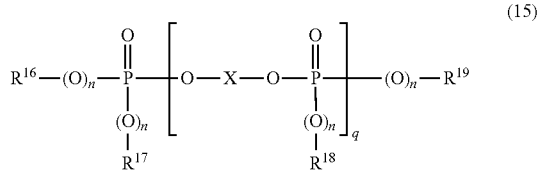

(15)

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is an aromatic group. In some embodiments $R^{16}$, $R^{17}$, $R^{18}$, and $R^{19}$ are each independently $C_{1-4}$ alkyl, naphthyl, phenyl($C_{1-4}$)alkylene, or aryl groups optionally substituted by $C_{1-4}$ alkyl. Specific aryl moieties are cresyl, phenyl, xylenyl, propylphenyl, or butylphenyl. In some embodiments X in formula (15) is a mono- or poly-nuclear aromatic $C_{6-30}$ moiety derived from a diphenol. Further in formula (15), n is each independently 0 or 1; in some embodiments n is equal to 1. Also in formula (15), q is from 0.5 to 30, from 0.8 to 15, from 1 to 5, or from 1 to 2. Specifically, X can be represented by the following divalent groups (16), or a combination comprising one or more of these divalent groups.

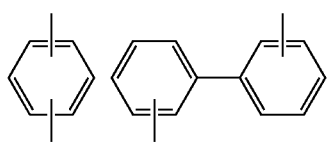

(16)

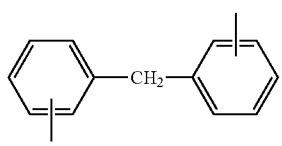

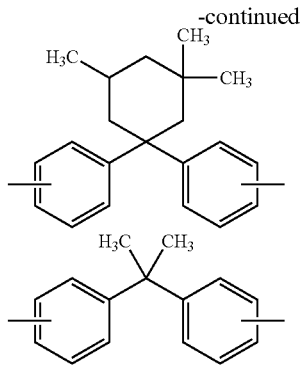

In these embodiments, each of $R^{16}$, $R^{17}$, $R^{18}$, and $R^{19}$ can be aromatic, i.e., phenyl, n is 1, and p is 1-5, specifically 1-2. In some embodiments at least one of $R^{16}$, $R^{17}$, $R^{18}$, $R^{19}$, and X corresponds to a monomer used to form the polycarbonate, e.g., bisphenol A or resorcinol. In another embodiment, X is derived especially from resorcinol, hydroquinone, bisphenol A, or diphenylphenol, and $R^{16}$, $R^{17}$, $R^{18}$, $R^{19}$, is aromatic, specifically phenyl. A specific aromatic organophosphorus compound of this type is resorcinol bis(diphenyl phosphate), also known as RDP. Another specific class of aromatic organophosphorus compounds having two or more phosphorus-containing groups are compounds of formula (17)

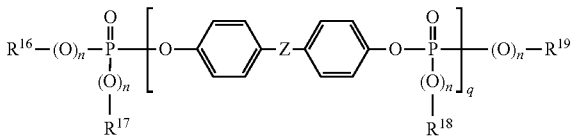

(17)

wherein $R^{16}$, $R^{17}$, $R^{18}$, $R^{19}$, n, and q are as defined for formula (19) and wherein Z is $C_{1-7}$ alkylidene, $C_{1-7}$ alkylene, $C_{5-12}$ cycloalkylidene, —O—, —S—, —SO$_2$—, or —CO—, specifically isopropylidene. A specific aromatic organophosphorus compound of this type is bisphenol A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

Organophosphorus compounds containing at least one phosphorus-nitrogen bond includes phosphazenes, phosphorus ester amides, phosphoric acid amides, phosphonic acid amides, phosphinic acid amides, and tris(aziridinyl)phosphine oxide. Phosphazenes (18) and cyclic phosphazenes (19)

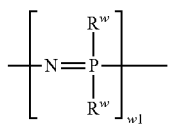

(18)

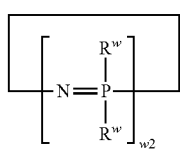

(19)

in particular can used, wherein w1 is 3 to 10,000 and w2 is 3 to 25, specifically 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

Accordingly, depending on the particular organophosphorus compound used, the polycarbonate compositions can comprise from 0.3 to 20 wt. %, or 0.5 to 15 wt. %, or 3.5 to 12 wt. % of the organophosphorus flame retardant, each based on the total weight of the composition. Specifically, the organophosphorus compounds can be bisphenol A bis(diphenyl phosphate), triphenyl phosphate, resorcinol bis(diphenyl phosphate), tricresyl phosphate, or a combination comprising at least one of the foregoing.

Anti-drip agents in most embodiments are not used in the polycarbonate compositions. Anti-drip agents include a fibril-forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. Antidrip agents are substantially absent or completely absent from the polycarbonate compositions in some embodiments.

Methods for forming the polycarbonate compositions can vary. In an embodiment, the polymers are combined (e.g., blended) with any additives (e.g., a mold release agent) such as in a screw-type extruder. The polymers any additives can be combined in any order, and in form, for example, powder, granular, filamentous, as a masterbatch, and the like. The polycarbonate compositions can be foamed, extruded into a sheet, or optionally pelletized. Methods of foaming a polycarbonate composition using frothing or physical or chemical blowing agents are known and can be used. The pellets can be used for molding into articles, foaming, or they can be used in forming a sheet of the flame retardant polycarbonate composition. In some embodiments, the composition can be extruded (or co-extruded with a coating or other layer) in the form of a sheet and/or can be processed through calendaring rolls to form the desired sheet.

As discussed above, the polycarbonate compositions are formulated to meet strict low smoke density requirements. The relative amounts of polycarbonate polymer and the second polymer in the polycarbonate compositions depends on the particular polycarbonate polymer and the second polymer used, the targeted level of smoke density and heat release, and other desired properties of the polycarbonate composition, such as impact strength and flow. In an embodiment, the second polymer is present in an amount effective to provide 0.10 wt. % to 1.00 wt. % silicon based on the total weight of the composition, and within this range the specific amount is selected to be effective to provide a smoke density (Ds-4) of less than 480, or less than 300 as determined in accordance with ISO 5659-2 on a 3 mm thick plaque at 50 kW/m². These values can be obtained in articles having a wide range of thicknesses, for example from 0.1 to 10 mm, or 0.5 to 5 mm.

The polycarbonate compositions can further have a maximum average rate of heat emission (MAHRE) of 90 kW/m² or less, or 75 kW/m² or less as measured according to ISO 5660-1 on a 3 mm thick plaque at 50 kW/m².

Use of a PC-siloxane, a polydialkylsiloxane, or a combination of a PC-siloxane and a polydialkylsiloxane can lower smoke density (Ds-4) of polycarbonate polymers to the desired levels. For example, polycarbonate polymers such as PPP-BP/BPA or PPC have limited inherent smoke properties, a combination of these polycarbonate polymers with a PC-siloxane such as (bisphenol A carbonate)-co-(polydimethylsiloxane) has positive effect on the smoke density (Ds-4) as determined according to ISO5659-2 on a 3 mm thick plaque at 50 kW/m², such that these compositions are suitable for EN-45545 type applications (for R3 applications qualifying for HL2 compliance, a smoke density (Ds-4) at or below 480 is required, and for R1 or R6 applications qualifying for HL2 compliance, a smoke density (Ds-4) at or below 300 is required), provided that the other required properties (e.g. heat release) meet the selection criteria as well. The compositions can further comprise an aromatic organophosphorus compound, e.g., RDP, BPDA, or a combination comprising at least one of the foregoing aromatic organophosphorus compounds.

The polycarbonate compositions can be formulated to have lower densities, in particular a density of 1.35 g/cc or less, 1.34 g/cc or less, 1.33 g/cc or less, 1.32 g/cc or less, 1.31 g/cc or less, 1.30 g/cc or less, or 1.29 g/cc or less. The same or similar values can be obtained in components having a wide range of thicknesses, for example from 0.1 to 10 mm, or 0.5 to 5 mm.

The polycarbonate compositions can further have good melt viscosities, which aid processing. The polycarbonate compositions can have a melt volume flow rate (MVR, cubic centimeter per 10 minutes (cc/10 min) of 4 to about 30, greater than or equal to 6, greater than or equal to 8, greater than or equal to 10, greater than or equal to 12, greater than or equal to 14, greater than or equal to 16, greater than or equal to 18, or greater than or equal to 20 cc/min, measured at 300° C./1.2 Kg at 360 second dwell according to ISO 1133. The same or similar values can be obtained in articles having a wide range of thicknesses, for example from 0.1 to 10 mm, or 0.5 to 5 mm.

The polycarbonate compositions can further have excellent impact properties, in particular multiaxial impact (MAI) and ductility. The compositions can have an MAI equal to or higher than 100 J, determined at 23° C. at an impact speed of 4.4 m/second in accordance with ISO 6603 on discs with a thickness of 3.2 mm. The compositions can have a ductility in multiaxial impact of 80% and higher, specifically 100%, determined at 23° C. at an impact speed of 4.4 m/second in accordance with ISO 6603 on discs with a thickness of 3.2 mm. These values can be obtained in articles having a wide range of thicknesses, for example from 0.1 to 10 mm, or 0.5 to 5 mm. In some embodiments, the composition can have an MAI equal to or higher than 100 J and a high ductility (80% or greater, for example 100%) at lower temperatures such as 10° C., 0° C., −10° C., −20° C. and −30° C.

As noted above the present discovery allows the manufacture of compositions have very low smoke densities (Ds-4), as determined according to ISO5659-2 on a 3 mm thick plaque at 50 kW/m², while maintaining the advantageous properties of polycarbonates. Thus, polycarbonate compositions having practical impact properties within 20%, within 10%, within 5%, or within 1% of the same compositions without the PC-siloxane or polydialkylsiloxane can be manufactured. For example, the polycarbonate compositions can have an MAI within 20%, within 10%, within 5%, or within 1% of the MAI of the same composition, each determined at 23° C. at an impact speed of 4.4 m/second in accordance with ISO 6603 on discs with a thickness of 3.2 mm The transmission property of the polycarbonate polymers can further be maintained in some embodiments.

Shaped, formed, or molded articles comprising the polycarbonate compositions are also provided. The polycarbonate compositions can be molded into useful shaped articles by a variety of means such as injection molding, extrusion, rotational molding, blow molding, and thermoforming to form articles. Thus the polycarbonate compositions can be used to form a foamed article, a molded article, a thermoformed article, an extruded film, an extruded sheet, one or more layers of a multi-layer article (e.g. a cap-layer), a substrate for a coated article, or a substrate for a metallized article.

Illustrative articles include access panels, access doors, air flow regulators air gaspers, air grilles, arm rests, baggage storage doors, balcony components, cabinet walls, ceiling panels, door pulls, door handles, duct housing, enclosures for electronic devices, equipment housings, equipment panels, floor panels, food carts, food trays, galley surfaces, grilles, handles, housings for TVs and displays, light panels, magazine racks, telephone housings, partitions, parts for trolley carts, seat backs, seat components, railing components, seat housings, shelves, side walls, speaker housings, storage compartments, storage housings, toilet seats, tray tables, trays, trim panel, window moldings, window slides, windows, and the like.

In an embodiment, the polycarbonate compositions are formulated to provide articles that meet certain criteria set forth in the new European Railway standard EN-45545 (2013). The European Union has approved the introduction of a set of fire testing standards for the railroad industry that prescribes certain flammability, flame spread rate, heat release, smoke emission, and smoke toxicity requirements for materials used in railway vehicles, known as European Railway standard EN-45545 (2013). Based on the vehicle material, end-use, and fire risks, 26 different "Requirement" categories for materials have been established (R1-R26).

Passenger seat shells (both back and base shell) fall under the R6 application type. Lighting strips fall under the R3 application type. The R1 application type covers, amongst others, interior vertical and horizontal surfaces, such as side walls, front/end walls, doors, ceiling panels, as well as luggage racks, linings and frames.

"Hazard Levels" (HL1 to HL3) have been designated, reflecting the degree of probability of personal injury as the result of a fire. The levels are based on dwell time and are related to operation and design categories. HL1 is the lowest hazard level and is typically applicable to vehicles that run under relatively safe conditions (easy evacuation of the vehicle). HL3 is the highest hazard level and represents most dangerous operation/design categories (difficult and/or time-consuming evacuation of the vehicle, e.g. in underground rail cars). For each application category, different test requirements for the hazard levels are defined. One of the key requirements is the smoke density, measured according to ISO 5659-2 at 50 kW/m² for which the smoke density (Ds-4) values for the various hazard levels in the European Railway standard EN-45545 (2013) are shown in Table 1B for R1, R3, and R6 applications.

TABLE 1

| Hazard level | DS-4 (R1) | DS-4 (R3) | DS-4 (R6) |
|---|---|---|---|
| HL1 | 600 | 960 | 600 |
| HL2 | 300 | 480 | 300 |
| HL3 | 150 | 240 | 150 |

Another requirement for R1 and R6 applications is heat release, measured according to ISO 5660-1 at 50 kW/m², for which the maximum average rate of heat emission (MAHRE) is the key parameter. For HL2, a MAHRE of 90 or lower is required, whereas for HL3 a MAHRE of 60 or lower is required.

Thus, while polycarbonate compositions can be used for the manufacture of a wide variety of articles, including high occupancy structures such as rail stations, airports and office buildings, the polycarbonate compositions are especially useful for the manufacture of transportation components.

As used herein, a "transportation component" is an article or portion of an article used in rolling stock, an aircraft, a roadway vehicle, or a marine vehicle. "Rolling stock" includes but is not limited to a locomotive, coach, light rail vehicle, underground rail vehicle, tram, trolley, magnetic levitation vehicle, and a cable car. An "aircraft" includes but is not limited to a jet, an airplane, an airship, a helicopter, a balloon, and a spacecraft. A "roadway vehicle" includes but is not limited to an automobile, bus, scooter and a motorcycle. A "marine vehicle" includes but is not limited to a boat, a ship (including freight and passenger ships), jet skis, and a submarine.

Exemplary transportation components for rolling stock (e.g., trains), aircraft, and roadway and marine vehicles, particularly rolling stock, includes interior components (e.g., structure and coverings) such as ceiling paneling, flaps, boxes, hoods, louvers, insulation material and the body shell in interiors, side walls, front walls/end walls, partitions, room dividers, interior doors, interior lining of the front- and end-wall doors and external doors, luggage overhead luggage racks, vertical luggage rack, luggage container, luggage compartments, windows, window frames, kitchen interiors, surfaces, lighting components, or a component assembly comprising at least one of the foregoing. In an embodiment any of the foregoing articles are in compliance with European Rail Standard EN-45545, for example meeting R1, R3, or R6 HL-2 applications.

The polycarbonate compositions are particularly useful in train and aircraft, for example a variety of aircraft compartment interior applications, as well as interior applications for other modes of transportation, such as bus, train, subway, marine, and the like. In a specific embodiment the articles are interior components for aircraft or trains, including access panels, access doors, air flow regulators baggage storage doors, display panels, display units, door handles, door pulls, enclosures for electronic devices, food carts, food trays, grilles, handles, magazine racks, seat components, partitions, refrigerator doors, seat backs, side walls, tray tables, trim panels, lighting components, claddings, train seats or components for train seats, light housing, train luggage racks, and the like. Specifically mentioned are train seat components, e.g., arms, backs, seats, tray tables, aesthetic trim, and the like, train walls, e.g., ceiling, top wall, or sidewall claddings, aesthetic trim, and the like, and components for lightings such as strips, housings, covers, aesthetic trim, and the like. The polycarbonate compositions can be formed (e.g., molded) into sheets or other shapes that can be used for any of the above mentioned components. It is generally noted that the overall size, shape, thickness, optical properties, and the like of the polycarbonate sheet or article can vary depending upon the desired application. In an embodiment any of the foregoing articles are in compliance with European Rail Standard EN-45545, for example meeting R1, R3, or R6 HL-2 applications.

Certain of the above-described compositions are particularly useful for the manufacture of a transportation component, in particular an aircraft component or a rolling stock component (e.g., a train component) having a smoke density (Ds-4) of less than 480, or less than 300 measured in accordance with ISO 5659-2 on a 3 mm thick plaque at 50 kW/m². Such materials can be in compliance with the new EN-45545 (2013), for example meeting HL2 requirements for $R^1$, $R^3$, or $R^6$ applications provided that the other required properties (e.g. heat release) meet the selection criteria as well. In an embodiment, such compositions comprise based on the weight of the composition, 65 to 95 wt. % of a polycarbonate copolymer comprising bisphenol A carbonate units, and units of the formula

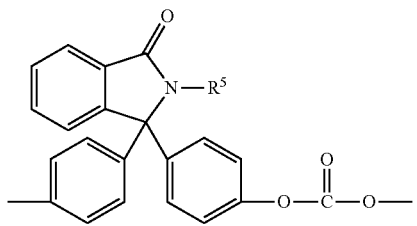

wherein $R^5$ is hydrogen, phenyl optionally substituted with up to five $C_{1-10}$ alkyl groups, or $C_{1-4}$ alkyl; and 5 to 35 wt. % of a poly(carbonate-siloxane) comprising bisphenol A carbonate units, and siloxane units of the formula

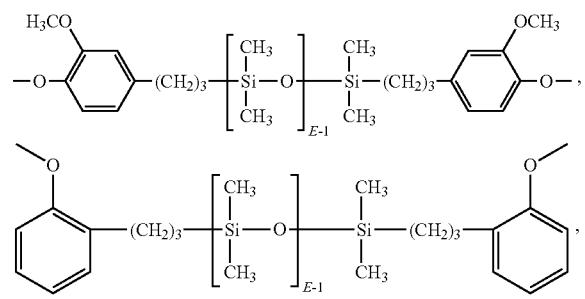

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); wherein no or substantially no brominated polycarbonate is present in the composition. Advantageously, the PC-siloxane is present in an amount effective to provide 0.10 wt. % to 1.00 wt. % silicon based on the total weight of the composition. In a specific embodiment, the composition comprises 5 wt. to 20 wt. % of the poly(carbonate-siloxane) having 1 to 10 mol % of siloxane units, and the composition has a transmission of greater than 60% determined according to ASTM D1003.

In another embodiment, these compositions comprise, based on the weight of the composition, 70 to 99 wt. % of a poly(bisphenol A carbonate)-co-(bisphenol phthalate ester) comprising 75 to 85 wt. % of the ester units, wherein the ester units have a molar ratio of isophthalate to terephthalate of 98:2 to 88:12; and 1 to 30 wt. % of a poly(carbonate-siloxane) comprising bisphenol A carbonate units, and siloxane units of the formula

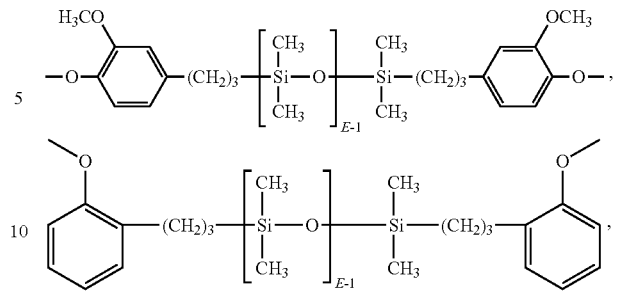

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane). Advantageously, the PC-siloxane is present in an amount effective to provide 0.10 wt. % to 1.00 wt. % silicon based on the total weight of the composition. In a specific embodiment, the composition comprises from 1 wt. % to 20 wt. % of the poly(carbonate-siloxane) comprising from 1 mol % to 10 mol % of siloxane units, and wherein the composition has a transmission of greater than 80% determined according to ASTM D1003.

These compositions can further comprise flame retardant such as BPADP. Inventors surprisingly found that BPADP it has a positive effect on the smoke density, heat release, melt flow properties, and at the same time, does not significantly affect ductility even at relatively high loadings. For example, the compositions can comprise, based on the weight of the composition, 45 to 92 wt. % of a polycarbonate copolymer comprising bisphenol A carbonate units, and units of the formula

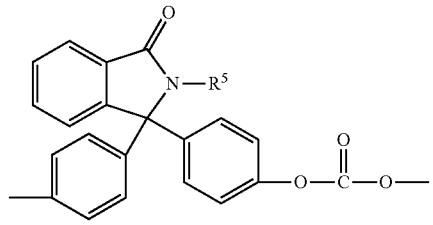

wherein $R^5$ is hydrogen, phenyl optionally substituted with 1 to 5 $C_{1-6}$ alkyl groups, or $C_{1-4}$ alkyl; 5 to 35 wt. % of a poly(carbonate-siloxane) comprising bisphenol A carbonate units, and siloxane units of the formula

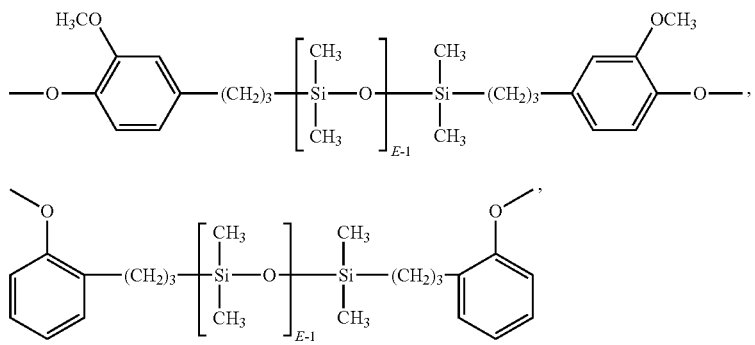

or a combination comprising at least one of the foregoing, wherein E has an average value of 2 to 200; wherein the poly(carbonate-siloxane) comprises 0.5 to 55 wt. % of siloxane units based on the total weight of the poly(polycarbonate-siloxane); and 3 to 20 wt. % of bisphenol A bis(diphenyl phosphate).

These compositions can also comprise, based on the weight of the composition, 50 to 93 wt. % of a poly(bisphenol A carbonate)-co-(bisphenol phthalate ester) comprising 75 to 85 wt. % of the ester units, wherein the ester units have a molar ratio of isophthalate to terephthalate of 98:2 to 88:12; 4 to 30 wt. % of a poly(carbonate-siloxane) comprising bisphenol A carbonate units, and siloxane units of the formula

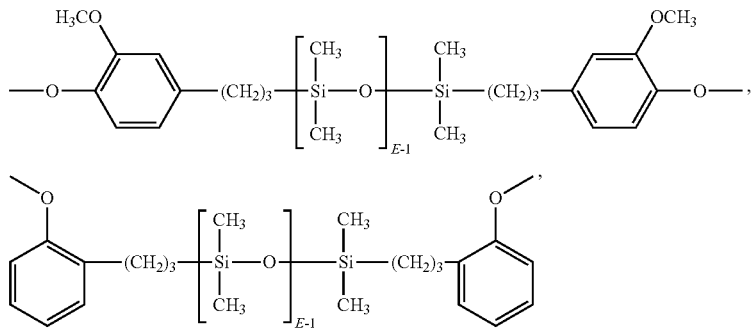

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); and 3 to 20 wt. % of bisphenol A bis(diphenyl phosphate).

A sample molded from these BPADP-containing compositions can have a smoke density after 4 minutes (DS-4) of less than 300, less than 250, or less than 200 determined according to ISO 5659-2 on a 3 mm thick plaque at 50 kW/m². A sample molded from these BPADP-containing compositions can also have a heat release (MAHRE) of less than 90, less than 80, less than 70 as determined in accordance with ISO 5660-1 on a 3 mm thick plaque. Furthermore, the polycarbonate compositions can have a melt volume flow rate (MVR, cubic centimeter per 10 minutes (cc/10 min) of 4 to about 15, measured at 300° C./1.2 Kg at 360 second dwell according to ISO 1133. The polycarbonate compositions can have an MAI equal to or higher than 100 J, determined at 23° C. at an impact speed of 4.4 m/second in accordance with ISO 6603 on discs with a thickness of 3.2 mm The polycarbonate compositions can have a ductility in multiaxial impact of 75% and higher, for example 100%, determined at 23° C. at an impact speed of 4.4 m/second in accordance with ISO 6603 on discs with a thickness of 3.2 mm.

The polycarbonate compositions having low smoke density and low heat release rates are further illustrated by the following non-limiting examples.

EXAMPLES

The materials used in the Examples are described in Table 2A.

TABLE 2A

| Component | Chemical Description | Source, Vendor |
|---|---|---|
| PC1 | Linear Bisphenol A Polycarbonate, produced via interfacial polymerization, Mw of about 30,000 g/mol as determined by GPC using polycarbonate standards, phenol end-capped | SABIC |
| PC2 | Linear Bisphenol A Polycarbonate, produced via interfacial polymerization, Mw of about 18,800 g/mol as determined by GPC using polycarbonate standards, para-cumylphenyl (PCP) end-capped | SABIC |
| PC3 | Branched Bisphenol A Polycarbonate resin, produced via interfacial polymerization, 3 mol % 1,1,1-tris(4-hydroxyphenyl)ethane (THPE) branching agent, cyanophenyl end-capped, Mw about 28,700 g/mol as determined by GPC using polycarbonate standards | SABIC |

TABLE 2A-continued

| Component | Chemical Description | Source, Vendor |
|---|---|---|
| PPP-BP/BPA | PPP-BP (N-phenylphenolphthaleinylbisphenol, 2,2-bis(4-hydro) - Bisphenol A Polycarbonate copolymer, produced via interfacial polymerization, 32 mol % PPP-BP, Mw about 25,000 g/mol as determined by GPC using polycarbonate standards, para-cumylphenol (PCP) end-capped | SABIC |
| SiPC1 | PDMS (polydimethylsiloxane) - Bisphenol A Polycarbonate copolymer, produced via interfacial polymerization, 20 wt. % siloxane, average PDMS block length of 45 units (D45), Mw about 30,000 g/mol as determined by GPC using polycarbonate standards, para-cumylphenol (PCP) end-capped | SABIC |
| SiPC2 | PDMS (polydimethylsiloxane) - Bisphenol A Polycarbonate copolymer, produced via interfacial polymerization, 6 wt. % siloxane, average PDMS block length of 45 units (D45), Mw about 23,000 g/mol as determined by GPC using polycarbonate standards, para-cumylphenol (PCP) end-capped | SABIC |
| SiPC3 | PDMS (polydimethylsiloxane) - Bisphenol A Polycarbonate copolymer, produced via interfacial polymerization 1 wt. % siloxane, average PDMS block length of 10 units (D10), Mw about 22,500 g/mol as determined by GPC using polycarbonate standards, para-cumylphenol (PCP) end-capped | SABIC |
| SiPC4 | PDMS (polydimethylsiloxane) - Bisphenol A Polycarbonate copolymer, produced via interfacial polymerization, 20 wt. % siloxane, average PDMS block length of 90 units (D90), Mw about 30.000 g/mol as determined by GPC using Polycarbonate standards, para-cumylphenol (PCP) end-capped | SABIC |
| PC-Ester1 | Poly(phthalate-carbonate) copolymer, produced via interfacial polymerization, about 81 mol % ester units, Mw about 28,500 g/mol as determined via GPC using polycarbonate standards, para-cumylphenol (PCP) end-capped | SABIC |
| PC-Ester2 | Poly(phthalate-carbonate) copolymer, produced via interfacial polymerization, about 60 mol % ester units, Mw about 35,400 g/mol as determined via GPC using polycarbonate standards, para-cumylphenol (PCP) end-capped | SABIC |
| PDMS 100 | Polydimethylsiloxane (PDMS) oil, M100 (100 cps) | MOMENTIVE |
| PDMS 350 | Polydimethylsiloxane (PDMS) oil, M350 (350 cps) | MOMENTIVE |
| PDMS 1000 | Polydimethylsiloxane (PDMS) oil, M1000 (1000 cps) | MOMENTIVE |
| PMPS | Polyphenylmethylsiloxane oil, PN200 | MOMENTIVE |
| OPCTS | Octaphenylcyclotetrasiloxane | MOMENTIVE |
| PEI | Polyetherimide resin, made via reaction of bisphenol A dianhydride with equimolar amount of m-phenylene diamine, Mw about 33,000 g/mol, determined via GPC using Polystyrene standards | SABIC |
| BPADP | Bisphenol A diphosphate | Nagase (Europe) GmbH |
| $TiO_2$ | Coated titanium dioxide | DuPont Titanium |
| Carbon black | Amorphous Carbon | Cabot |
| GAFOS 168 | Tris(di-t-butylphenyl)phosphite | BASF |
| IRGANOX 1076 | Octadecyl-3-(3,5-di-tert-butyl-4-hydroxyphenyl) propionate | BASF |

The tests performed are summarized in Table 2B.

TABLE 2B

| Description | Test | Conditions | Specimen | Property | Units |
|---|---|---|---|---|---|
| ISO Smoke density | ISO 5659-2 | 50 kW/m$^2$ | plaque 75 × 75 × 3 mm | DS-4 | [—] |
| ISO Heat release | ISO 5660-1 | 50 kW/m$^2$ | plaque 100 × 100 × 3 mm | MAHRE | kW/m$^2$ |
| Melt volume rate | ISO 1133 | 300° C., 1.2 kg, dwell time 300 s | Pellets | MVR | cm$^3$/10 min |
| Melt viscosity | ISO 1143 | 300° C., shear rate of 1500 s$^{-1}$ | Pellets | MV | Pa · s |
| Multiaxial Impact, Energy and Ductility | ISO 6603 | 4.4 m/s, temperatures of 23° C. and 0° C. | Disc, 3.2 mm thickness, 100 mm diameter | MAI | J (Energy), % (Ductility) |
| Transmission | ASTM D1003 | | plaque 75 × 75 × 3 mm | Transmission | % |
| Haze | ASTM D1003 | | plaque 75 × 75 × 3 mm | Haze | — |

Blending, Extrusion, and Molding Conditions

The compositions were made as follows. All solid additives (e.g., stabilizers, colorants, solid flame retardants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The liquid flame retardants (e.g., BPADP) were fed before the vacuum using a liquid injection system. It will be recognized by one skilled in the art that the method is not limited to these temperatures or processing equipment.

Extrusion of all materials was performed on a 25 mm Wemer-Pfleiderer ZAK twin-screw extruder (L/D ratio of 33/1) with a vacuum port located near the die face. The extruder has 9 zones, which were set at temperatures of 40° C. (feed zone), 200° C. (zone 1), 250° C. (zone 2), 270° C. (zone 3) and 280-300° C. (zone 4 to 8). Screw speed was 300 rpm and throughput was between 15 and 25 kg/hr. It will be recognized by one skilled in the art that the method is not limited to these temperatures or processing equipment.

The compositions were molded after drying at 100-110° C. for 6 hours on a 45-ton Engel molding machine with 22 mm screw or 75-ton Engel molding machine with 30 mm screw operating at a temperature 270-300° C. with a mold temperature of 70-90° C. It will be recognized by one skilled in the art that the method is not limited to these temperatures or processing equipment.

ISO smoke density measurements were performed on 7.5× 7.5 cm plaques with 3 mm thickness using an NBS Smoke Density Chamber from Fire Testing Technology Ltd (West Sussex, United Kingdom). All measurements were performed according to ISO 5659-2, with an irradiance of 50 kW/m$^2$ at the sample position and a sample-to-cone distance of 5 cm in view of the charring behavior of the samples (as prescribed by ISO 5659-2). DS-4 was determined as the measured smoke density after 240 seconds. The tests executed are indicative tests. They were performed according to the ISO5659-2 standard, but were not executed by an officially certified test institute.

ISO heat release measurements were performed on 10×10 cm plaques with 3 mm thickness using a Cone calorimeter. All measurements were performed according to ISO 5660-1, with 50 kW/m$^2$ irradiance at the sample position and a sample-to-cone distance of 6 cm in view of the charring behavior of the samples (as prescribed by ISO 5660-1). Heat release is measured as MAHRE in kW/m$^2$ as prescribed by ISO5660-1. The tests executed are indicative tests, and were executed by an officially certified test institute.

Silicon content is a weight percent calculated by dividing the total weight of silicon atoms in a composition over the total weight of the composition.

Examples 1-13

Examples 1-13 demonstrate the effect of the addition of various polycarbonate-siloxane copolymers and polydimethylsiloxane (PDMS) oil to PPP-BP/BPA copolymers on smoke density, transparency, and haze properties. Formulations and results are shown in Table 3. The results are also illustrated graphically in FIGS. 1 and 2.

extent that obtained DS-4 values for compositions containing SiPC2 and PPP-BP/BPA are below the HL2 thresholds for EN45545 R1 or R6 HL-2 qualifying applications (DS-4<300). Too high SiPC2 loadings (>20 wt. %) result in a higher DS-4 value far exceeding the DS-4 threshold of 300 for HL2 compliant R1 or R6 applications, but are below the DS-4 threshold for R3 applications (DS-4<480).

The improvement in smoke density is also observed when other polydimethylsiloxane/bisphenol A polycarbonate copolymer types are added to the PPP-BP/BPA copolymer, as can be seen for both polydimethylsiloxane/bisphenol A polycarbonate copolymer having 20 wt. % siloxane units, (SiPC1, examples 7-9) and polydimethylsiloxane/bisphenol A polycarbonate copolymer having 1 wt. % siloxane units (SiPC3, Examples 10 and 11). There are some differences in the ability of different polydimethylsiloxane/bisphenol A polycarbonate copolymer types to reduce smoke density of PPP-BP/BPA copolymer even at similar silicon contents. Nonetheless, the addition of optimal amounts of SiPC1, SiPC2 and SiPC3 to PPP-BP/BPA copolymer reduces the smoke density to such an extent that obtained DS-4 values for compositions containing PPP-BP/BPA and SiPC are below the thresholds for EN45545 R3 HL-2 applications (DS-4<480) or even R1 or R6 HL-2 applications (DS-4<300).

Using relatively small amounts of either polydimethylsiloxane/bisphenol A polycarbonate copolymer having 6 wt. % siloxane units (SiPC2, 10 wt. % max) or polydimethylsiloxane/bisphenol A polycarbonate copolymer having 1 wt. % siloxane units (SiPC3) retains the relatively high transmission values of PPP-BP/BPA copolymer of 80% and higher and keeps the haze increase to acceptable levels below 5. The addition of the polydimethylsiloxane/bisphenol A polycarbonate copolymer having 20 wt. % siloxane units, on the

TABLE 3

| | Unit | CEx1 | Ex2 | Ex3 | Ex4 | CEx5 | CEx6 | CEx7 | Ex8 | Ex9 | Ex10 | CEx11 | CEx12 | CEx13 |
|---|---|---|---|---|---|---|---|---|---|---|---|---|---|---|
| Component | | | | | | | | | | | | | | |
| PPP-BP/BPA | Wt % | 100.00 | 89.95 | 79.95 | 69.95 | 59.95 | | 96.95 | 93.95 | 89.95 | 83.45 | 66.65 | 99.4 | 98.57 |
| SiPC2 | Wt % | | 10.00 | 20.00 | 30.00 | 40.00 | 100.00 | | | | | | | |
| SiPC1 | Wt % | | | | | | | 3.00 | 6.00 | 10.00 | | | | |
| SiPC3 | Wt % | | | | | | | | | | 16.50 | 33.30 | | |
| PDMS 1000 | Wt % | | | | | | | | | | | | 0.55 | 1.38 |
| Irgafos 168 | Wt % | | 0.05 | 0.05 | 0.05 | 0.05 | | 0.05 | 0.05 | 0.05 | 0.05 | 0.05 | 0.05 | 0.05 |
| Si content | Wt % | 0.00 | 0.21 | 0.42 | 0.62 | 0.83 | 2.08 | 0.21 | 0.42 | 0.69 | 0.06 | 0.13 | 0.21 | 0.52 |
| Property | | | | | | | | | | | | | | |
| Smoke density, DS-4 | — | 626 | 237 | 323 | 415 | 421 | 935 | 545 | 341 | 218 | 366 | 567 | 587 | 569 |
| Transparency | % | 88.4 | 81.9 | 67.7 | 53.6 | 6 | 87.6 | 36.2 | 28.3 | 21.4 | 88.4 | 88.6 | 30.6 | 24.7 |
| Haze | — | 1.14 | 3.8 | 18.1 | 42.8 | 19.0 | 2.48 | 104 | 104 | 104 | 0.78 | 0.89 | 104 | 104 |

Comparative Examples 1 and 6 show that both PPP-BP/BPA copolymer and polydimethylsiloxane/bisphenol A polycarbonate copolymer having 6 wt. % siloxane units (SiPC2) have relatively high smoke densities (DS-4) at 50 kW/m$^2$, measured according to ISO5659-2, far exceeding Hazard Level 2 requirements for EN45545 R1 or R6 applications (DS-4<300) or R3 applications (DS-4<480). Surprisingly, when relatively low amounts of SiPC2 are added to PPP-BP/BPA copolymer, the DS-4 values of the composition containing both SiPC2 and PPP-BP/BPA decrease significantly (Examples 2-4) as compared to compositions containing SiPC2 but not PPP-BP/BPA (Comparative Example 6) and compositions containing PPP-BP/BPA but not SiPC2 (Comparative Example 1).

Figure 2:
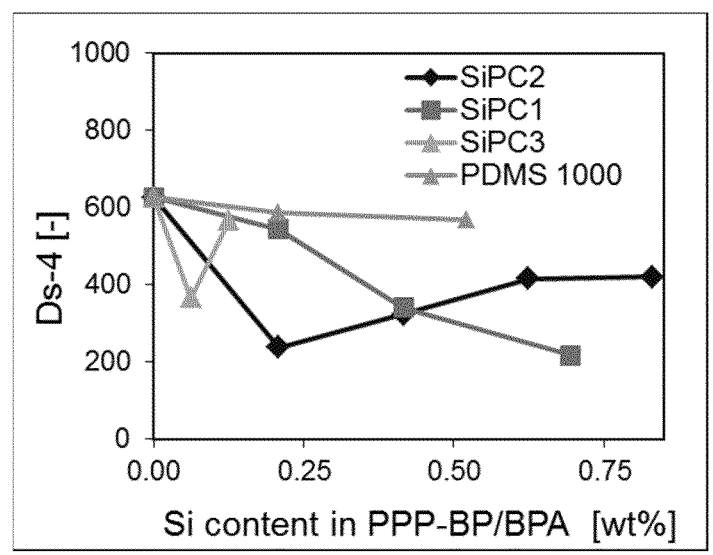
FIG. 2 shows the effect of the silicon content in PPP-BP/BPA on smoke density (Ds-4)

Furthermore, there is an optimum in the amount of SiPC2 that may be added, on the smoke density improvement. FIG. 1 shows that for concentrations of SiPC2 above 10 wt. %, the smoke density values start to increase again. For the optimum SiPC2 loadings, the smoke density is reduced to such an other hand, results in significant reduction in transmission and increase in haze because of the opaque nature of this SiPC type. As such, addition of SiPC1 to PPP-BP/BPA copolymer to reduce smoke density in rail components to meet EN45545 R3, R1 or R6 qualifying application is only suitable when targeting non-transparent applications. The same is true for SiPC2, if the loadings are above 10 wt. %. In general, transparent compositions can be tuned by the amount of polydimethylsiloxane/bisphenol A polycarbonate copolymer and its architecture.

From Comparative Examples 12 and 13, it is evident that polydimethylsiloxane (PDMS) oil results only in minor reductions in smoke density of PPP-BP/BPA, much less than observed for any of the polydimethylsiloxane/bisphenol A polycarbonate copolymers at similar silicon content. Furthermore, the PPP-BP/BPA samples turn completely opaque after PDMS oil is added, since PDMS is not miscible with the PPP-BP/BPA copolymer. As such, polydimethylsiloxane/bisphenol A polycarbonate copolymers are much more suitable for reducing the smoke density of PPP-BP/BPA copolymers than PDMS oil, despite the similar nature of the siloxane (polydimethylsiloxane).

Examples 14-29

These examples demonstrate the effect of the addition of various polydimethylsiloxane/bisphenol A polycarbonate copolymers and polysiloxanes to branched polycarbonate on smoke density, transmission and haze properties.

Examples 14-21

Examples 14-21 demonstrate the effect of adding polydimethylsiloxane/bisphenol A polycarbonate copolymer having 6 wt. % siloxane units (SiPC2) to branched bisphenol A polycarbonate resin end-capped with cyanophenyl groups (PC3) on smoke density and other properties. Formulations and results are shown in Table 4. The results are also illustrated graphically in FIG. 3.

Examples 1-13. For the optimum SiPC2 loadings, the smoke density is reduced to such an extent that obtained DS-4 values for compositions containing SiPC2 and PC3 are close to, but not meeting the thresholds for EN45545 R1 or R6 HL-2 qualifying applications (DS-4<300). Addition of flame retardants such as BPADP or sulphonated salts may further improve the properties of these compositions, in particular, smoke density so that the resultant compositions would meet the DS-4 threshold of 300 for EN45545 R1 or R6 HL-2 qualifying applications. DS-4 values of the compositions containing optimal SiPC2 loadings are low enough to meet requirements for R3 applications (DS-4<480).

In the case of branched bisphenol A polycarbonate resin end-capped with cyanophenyl groups (PC3), the addition of polydimethylsiloxane/bisphenol A polycarbonate copolymer having 6 wt. % siloxane units (SiPC2) does not have a significant effect on the optical properties (transmission of 85% or higher and haze of 3 or lower) over the full range of SiPC2 concentrations, allowing materials that are suitable for transparent applications, as well as diffuse, translucent and opaque

TABLE 4

| | Unit | CEx14 | CEx15 | Ex16 | Ex17 | Ex18 | Ex19 | CEx20 | CEx21 |
|---|---|---|---|---|---|---|---|---|---|
| Component | | | | | | | | | |
| PC3 | Wt % | 100 | 97.38 | 94.88 | 92.38 | 89.88 | 79.88 | 69.88 | |
| SiPC2 | Wt % | | 2.50 | 5.00 | 7.50 | 10.00 | 20.00 | 30.00 | 100 |
| Irgafos 168 | Wt % | | 0.08 | 0.08 | 0.08 | 0.08 | 0.08 | 0.08 | |
| Irganox 1076 | Wt % | | 0.04 | 0.04 | 0.04 | 0.04 | 0.04 | 0.04 | |
| Si content | Wt % | | 0.05 | 0.10 | 0.16 | 0.21 | 0.42 | 0.62 | 2.08 |
| Property | | | | | | | | | |
| Smoke density, DS-4 | — | 1165 | 668 | 494 | 304 | 370 | 376 | 550 | 935 |
| Transmission | % | 88.9 | 90.2 | 89.8 | 89.8 | 89.0 | 87.3 | 86.3 | 87.6 |
| Haze | — | 2.74 | 1.51 | 0.65 | 1.83 | 1.57 | 2.06 | 1.77 | 2.48 |

Comparative Examples 14 and 21 show that both branched bisphenol A polycarbonate resin end-capped with cyanophenyl groups (PC3) and polydimethylsiloxane/bisphenol A polycarbonate copolymer having 6 wt. % siloxane units (SiPC2) have relatively high DS-4 values (1165 and 935 respectively), measured at 50 kW/m$^2$ according to ISO5659-2, far exceeding HL2 requirements for EN45545 R1 or R6 applications (DS-4<300) or R3 applications (DS-4<480).

When relatively small amounts of SiPC2 are added to PC3, the DS-4 values of the composition containing both SiPC2 and PC3 decrease significantly (Examples 15-20).

Figure 3:
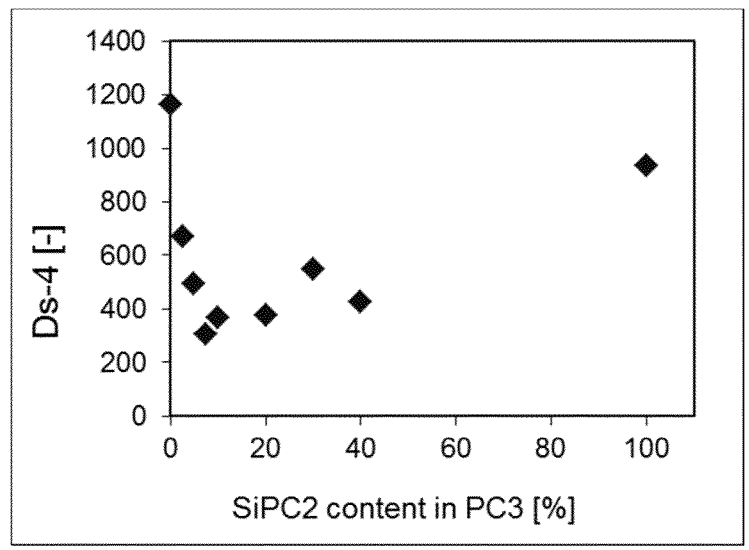
FIG. 3 shows the effect of the SiPC2 content in PC3 on smoke density (Ds-4)

The decrease in smoke density is dependent on the SiPC2 content. Values below the thresholds for EN45545 R3 applications (DS-4<480) are achieved for SiPC2 loadings between 5 and 25 wt. % (Examples 16-19). Too high loadings of SiPC2 cause a too high DS-4 value and are not desired (see Comparative Example 20). As shown in FIG. 3, the optimum SiPC2 content in the PC3-containing compositions is around 7.5 wt. %, which is comparable to the optimum SiPC2 content in the PPP-BP/BPA-containing compositions as described in colors, which can be tuned via a colorant package. Again, in general, transparent compositions can be tuned by the architecture of the polydimethylsiloxane/bisphenol A polycarbonate copolymer.

Examples 22-29

Figure 4:
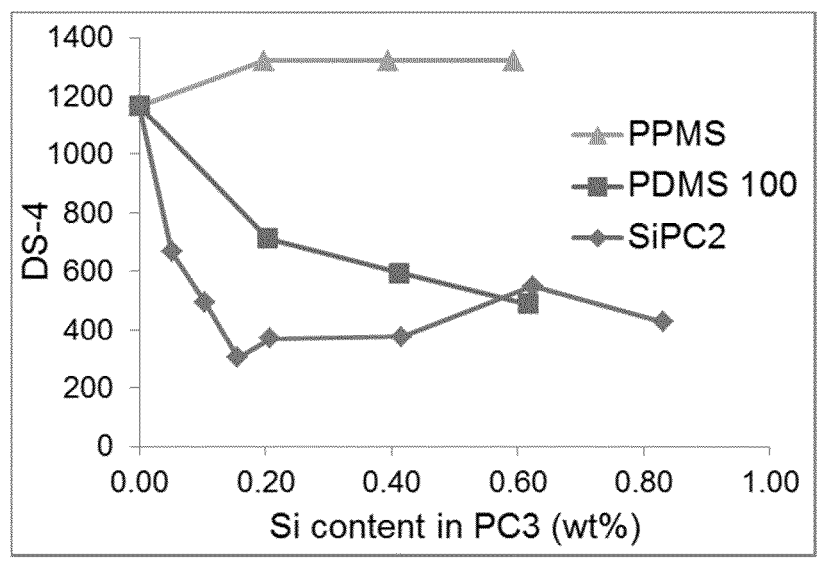
FIG. 4 shows the effect of silicon content in PC3 on smoke density (Ds-4)

Examples 22-29 demonstrate the effect of adding polydimethylsiloxane (PDMS) or polymethylphenylsiloxane (PMPS) in oil form, instead of polydimethylsiloxane/bisphenol A polycarbonate copolymer having 6 wt. % siloxane units (SiPC2) to branched bisphenol A polycarbonate resin end-capped with cyanophenyl groups (PC3) on smoke density, transmission, and haze. The examples also illustrate the effect of the siloxane type on smoke reduction of PC3 by comparing the PDMS oil to PMPS oil. Results and formulations are shown in Table 5. The results are also illustrated graphically in FIG. 4.

TABLE 5

| | Unit | CEx22 | CEx23 | CEx24 | CEx25 | CEx26 | CEx27 | CEx28 | CEx29 |
|---|---|---|---|---|---|---|---|---|---|
| Component | | | | | | | | | |
| PC3 | Wt % | 99.34 | 98.79 | 98.25 | 98.92 | 97.96 | 97.00 | 99.34 | 99.34 |
| PDMS 100 | Wt % | 0.54 | 1.09 | 1.63 | | | | | |
| PDMS 350 | Wt % | | | | | | | 0.54 | |
| PDMS 1000 | Wt % | | | | | | | | 0.54 |
| PMPS | Wt % | | | | 0.96 | 1.92 | 2.88 | | |
| Irgafos 168 | Wt % | 0.08 | 0.08 | 0.08 | 0.08 | 0.08 | 0.08 | 0.08 | 0.08 |
| Irganox 1076 | Wt % | 0.04 | 0.04 | 0.04 | 0.04 | 0.04 | 0.04 | 0.04 | 0.04 |

TABLE 5-continued

| | Unit | CEx22 | CEx23 | CEx24 | CEx25 | CEx26 | CEx27 | CEx28 | CEx29 |
|---|---|---|---|---|---|---|---|---|---|
| Si content | Wt % | 0.20 | 0.41 | 0.62 | 0.20 | 0.40 | 0.59 | 0.20 | 0.20 |
| Property | | | | | | | | | |
| Smoke density, DS-4 | — | 712 | 596 | 489 | 1320 | 1320 | 1320 | 667 | 678 |
| Transmission | % | 38.6 | 33.8 | 27.2 | 90.1 | 90.4 | 90.4 | 38.7 | 38.5 |
| Haze | — | 104 | 104 | 104 | 1.5 | 1.58 | 2.07 | 104 | 104 |

As demonstrated by Examples 15-19, 22-24, and 28-29, using SiPC2 in PC3-based compositions (Examples 15-19) is more efficient in reducing smoke density of PC3 than PDMS oil (Examples 22-24 and 28-29) at similar silicon contents. Nevertheless, both PDMS oil and SiPC2 reduce the smoke density of PC3. In contrast, the PMPS oil increases smoke density values of PC3 to the maximum measurable DS-4 value according to ISO 5659-2, namely 1320. The results demonstrate that the effect of SiPC2 on reducing smoke density is not simply translatable to any siloxane type, and that aliphatic siloxanes provide better results in terms of smoke density reduction as compared to siloxanes containing aromatic groups. This is highly unexpected, as for other flame properties, such as UL V-0 compliance, the siloxane of choice is typically phenyl based (like octaphenylcyclotetrasiloxane or polyphenylmethylsiloxane) rather than PDMS.

Examples 22, 28 and 29 demonstrate the effect of adding PDMS having different chain lengths to PC3 on smoke density. These examples show that the chain length of PDMS oil does not have any significant effect on the reduction of smoke density of PC3. PDMS 1000, PDMS 350, and PDMS 100, although having different chain lengths, all reduced the smoke density of PC3 to similar levels with the same loading level.

Furthermore, the addition of PDMS oil to branched bisphenol A polycarbonate resin end-capped with cyanophenyl groups (PC3) results in a deterioration of the optical properties, i.e. significant reduction in transmission and increase in haze.

These results have demonstrated that polydimethylsiloxane/bisphenol A polycarbonate copolymer is the preferred source of siloxane to achieve smoke density reductions in branched bisphenol A polycarbonate resin end-capped with cyanophenyl groups (PC3), as it more efficient in reducing DS-4 values than PDMS oil, and especially PPMS oil, at similar silicon contents. Furthermore, using the polydimethylsiloxane/bisphenol A polycarbonate copolymer instead of pure PDMS results in retention of the good optical properties of PC3, whereas the latter has a significant negative effect.

Examples 30-53

Examples 30-53 demonstrate the effect of the addition of various polydimethylsiloxane/bisphenol A polycarbonate copolymers and polysiloxanes to poly(phthalate-carbonate) copolymer (PC-Ester1) on smoke density, transmission, and haze.

Examples 30-37

Figure 5:
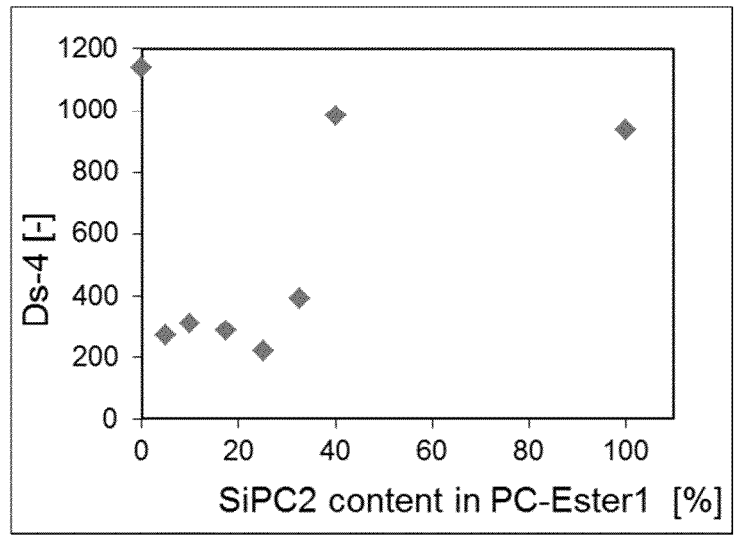
FIG. 5 shows the effect of the content of SiPC2 in PC-Ester1 on smoke density (Ds-4)

These examples show the effect of adding polydimethylsiloxane/bisphenol A polycarbonate copolymer having 6 wt. % siloxane units (SiPC2) to poly(phthalate-carbonate) copolymer having 81 mol % ester units (PC-Ester1). Formulations and results are shown in Table 6. The results are illustrated graphically in FIG. 5.

TABLE 6

| | Unit | CEx30 | Ex31 | Ex32 | Ex33 | Ex34 | Ex35 | CEx36 | CEx37 |
|---|---|---|---|---|---|---|---|---|---|
| Component | | | | | | | | | |
| PC-Ester1 | Wt % | 100.00 | 94.95 | 89.95 | 82.45 | 74.95 | 67.45 | 59.95 | |
| SiPC2 | Wt % | | 5.00 | 10.00 | 17.50 | 25.00 | 32.50 | 40.00 | 100 |
| Irgafos 168 | Wt % | | 0.05 | 0.05 | 0.05 | 0.05 | 0.05 | 0.05 | |
| Si content | Wt % | 0.00 | 0.10 | 0.21 | 0.36 | 0.52 | 0.68 | 0.83 | 2.08 |
| Property | | | | | | | | | |
| Smoke density, DS-4 | — | 1140 | 269 | 308 | 286 | 219 | 389 | 983 | 930 |
| Transmission | % | 87.7 | 86.3 | 79.9 | 61.8 | 50.9 | 42.5 | 38.1 | 87.6 |
| Haze | — | 1.42 | 2.12 | 6.56 | 28.8 | 49 | 67.4 | 77.9 | 2.48 |

Comparative Examples 30 and 37 show that both poly (phthalate-carbonate) copolymer having 81 mol % ester units (PC-Ester1) and polydimethylsiloxane/bisphenol A polycarbonate copolymer having 6 wt. % siloxane units (SiPC2) have a smoke density value (DS-4) that is high (1140 and 930, respectively for comparative examples 30 and 37), to the point where compositions made from PC-Ester1 alone or SiPC2 alone would not comply with the EN45545 rail standard (2013) threshold for qualifying under R1 or R6 material selection criteria for any Hazard Level (HL) applications (DS-4<600 for HL-1, DS-4<300 for HL2 and DS-4<150 for HL3).

Again, adding small amounts of SiPC2 to PC-Ester1 decreases the smoke density values significantly (Examples 31-35). The decrease in smoke density is dependent on the SiPC2 content, with DS-4 values below 300 for SiPC2 loadings between 5 and 25% (Examples 31-35). As illustrated graphically in FIG. 5, too high SiPC2 loadings result in a too high DS-4 value (983) again (Comparative Example 36), similar to the DS-4 value of pure SiPC2 (930, Comparative Example 37). The addition of optimal amounts of SiPC2 to PC-Ester1 reduces the smoke density to such an extent that obtained DS-4 values for compositions containing PC-Ester1 and SiPC2 are below the thresholds for EN45545 R3 HL-2 applications (DS-4<480) or even R1 or R6 HL-2 applications (DS-4<300).

The addition of SiPC2 to PC-Ester1 reduces the transmission and increases the haze with increasing SiPC2 contents. At low SiPC2 contents, the reduction in transmission is relatively limited with transmission values of 80% and higher and haze values of 10 and lower. By optimizing the polydimethylsiloxane/bisphenol A polycarbonate copolymer content and its architecture, a combination of both low smoke density and acceptable optical properties can be achieved.

Similarly, the D-length of the siloxane block does not have a significant influence on the smoke density when compared at the same silicon content in the final formulation, comparing SiPC1 (20 wt. % D45) and SiPC4 (20 wt. % D90), as well as SiPC3 (D-length of 10 units, but also a different content).

TABLE 7

|  | Unit | Ex38 | Ex39 | Ex40 | Ex41 | Ex42 | Ex43 | Ex44 |
|---|---|---|---|---|---|---|---|---|
| Component |  |  |  |  |  |  |  |  |
| PC-Ester 1 | Wt % | 96.88 | 92.38 | 87.88 | 74.88 | 49.88 | 96.88 | 92.38 |
| SiPC1 | Wt % | 3.00 | 7.50 | 12.00 |  |  |  |  |
| SiPC3 | Wt % |  |  |  | 25.00 | 50.00 |  |  |
| SiPC4 | Wt % |  |  |  |  |  | 3.00 | 7.50 |
| PDMS 1000 | Wt % |  |  |  |  |  |  |  |
| PMPS | Wt % |  |  |  |  |  |  |  |
| OPCTS | Wt % |  |  |  |  |  |  |  |
| Irgafos 168 | Wt % | 0.08 | 0.08 | 0.08 | 0.08 | 0.08 | 0.08 | 0.08 |
| Antioxidant 1076 | Wt % | 0.04 | 0.04 | 0.04 | 0.04 | 0.04 | 0.04 | 0.04 |
| Si content | Wt % | 0.21 | 0.52 | 0.83 | 0.09 | 0.19 | 0.21 | 0.53 |
| Property |  |  |  |  |  |  |  |  |
| Smoke density, DS-4 | — | 388 | 263 | 280 | 592 | 354 | 346 | 239 |
| Transmission | % | 39.7 | 27.7 | 20.1 | 89.7 | 89.4 | 36.7 | 24.2 |
| Haze | — | 97.4 | 104 | 104 | 0.55 | 0.64 | 104 | 104 |

|  | CEx47 | Ex48 | Ex49 | CEx50 | CEx51 | CEx52 | CEx53 |
|---|---|---|---|---|---|---|---|
| Component |  |  |  |  |  |  |  |
| PC-Ester 1 | 99.33 | 98.50 | 97.68 | 98.85 | 97.36 | 98.39 | 96.19 |
| SiPC1 |  |  |  |  |  |  |  |
| SiPC3 |  |  |  |  |  |  |  |
| SiPC4 |  |  |  |  |  |  |  |
| PDMS 1000 | 0.55 | 1.38 | 2.20 |  |  |  |  |
| PMPS |  |  |  | 1.03 | 2.52 |  |  |
| OPCTS |  |  |  |  |  | 1.49 | 3.69 |
| Irgafos 168 | 0.08 | 0.08 | 0.08 | 0.08 | 0.08 | 0.08 | 0.08 |
| Antioxidant 1076 | 0.04 | 0.04 | 0.04 | 0.04 | 0.04 | 0.04 | 0.04 |
| Si content | 0.21 | 0.52 | 0.83 | 0.21 | 0.52 | 0.21 | 0.52 |
| Property |  |  |  |  |  |  |  |
| Smoke density, DS-4 | 510 | 217 | 279 | 778 | 553 | 560 | 592 |
| Transmission | 29.4 | 18.7 | 16.4 | 90.0 | 89.7 | 89.1 | 89.7 |
| Haze | 104 | 104 | 104 | 0.51 | 0.48 | 1.13 | 1.43 |

Examples 38-44 and 47-53

These examples demonstrate the effect of adding different polydimethylsiloxane/bisphenol A polycarbonate copolymer and polysiloxanes to poly(phthalate-carbonate) copolymer having 81 mol % ester units (PC-Ester 1) on smoke density. Formulations and results are shown in Table 7. The results are also graphically illustrated in FIGS. 6 and 7

Figure 6:
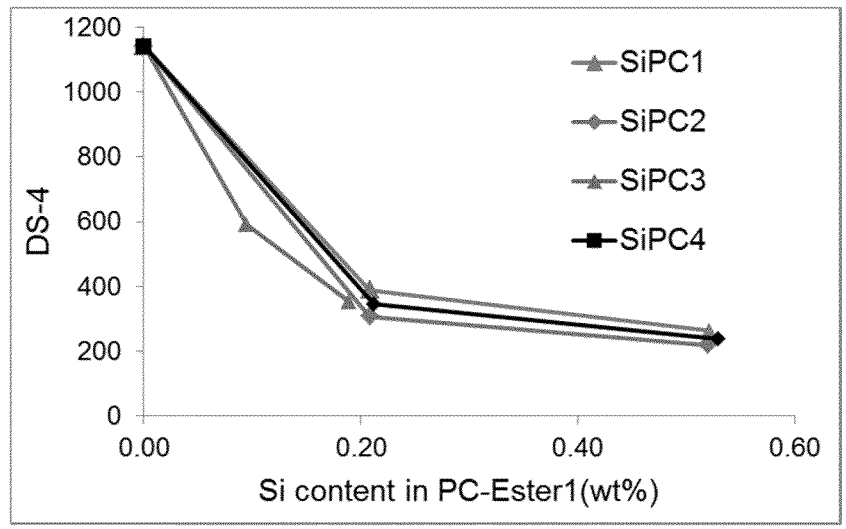
FIG. 6 shows the effect of the silicon content from various polycarbonate-siloxane copolymers in PC-Ester1 on smoke density (Ds-4)
Figure 7:
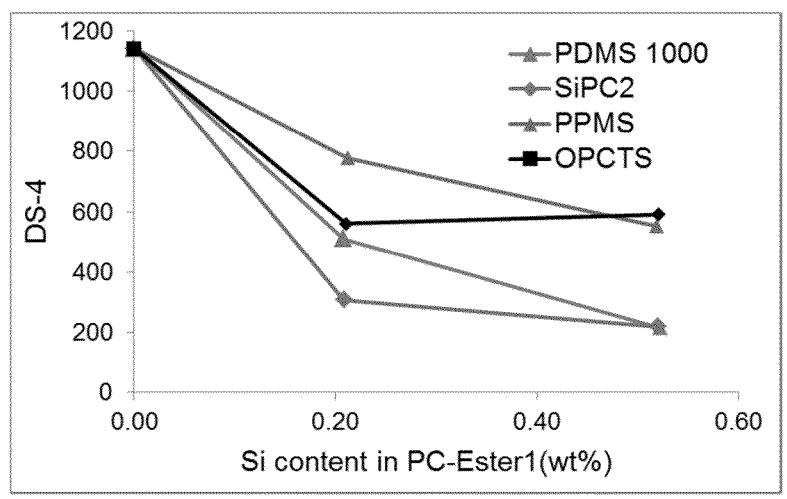
FIG. 7 shows the effect of the silicon content from various polysiloxanes in PC-Ester1 on smoke density (Ds-4).

Examples 37-44 demonstrate the effect of adding different polydimethylsiloxane/bisphenol A polycarbonate copolymers having different mol percentages of siloxane units (SiPC1, 2, 3 and 4) to poly(phthalate-carbonate) copolymer having 81 mol % ester units (PC-Ester1) on smoke density. Table 7 and FIG. 6 show that for the different SiPC types, similar improvements in DS-4 values are achieved, independent of the SiPC architecture. In particular, DS-4 values are in the same range for the different SiPC types at the same silicon content. At a silicon content of 0.21 wt. %, DS-4 values of 300 to 400 are obtained for SiPC1 (Example 38), SiPC2 (Example 32) and SiPC4 (Example 43). At a silicon content of 0.52 wt. %, DS-4 values of 200 to 280 are obtained for SiPC1 (Example 39), SiPC2 (Example 34) and SiPC4 (Example 44).

Results show that the siloxane content in the polydimethylsiloxane/bisphenol A polycarbonate copolymer has no significant influence on the smoke density when compared at the same silicon content in the final formulation, comparing SiPC1 (20 wt. % D45) and SiPC2 (6 wt. % D45).

In all cases, DS-4 values can be achieved below the thresholds for EN45545 R3 applications (DS-4<480) or even R1 or R6 applications (DS-4<300), depending on the SiPC content in the composition.

Examples 47-53 (Table 7 and FIG. 7) show that the effects on smoke density reduction of PC-Ester 1 are different for siloxane oils compared to SiPC copolymers. Polydimethyl siloxane (PDMS) oil also gives improvements in DS-4, but is less efficient. For example, higher silicon contents are needed to achieve a DS-4 value meeting the requirements for R1 or R6 applications (DS-4<300). As before, polymethylphenylsiloxane (PMPS) oil as well as octaphenylcyclotetrasiloxane (OPCTS) do not improve smoke density of PC-Ester1 copolymer as efficient as PDMS oil, again demonstrating the need for an aliphatic siloxane type (PDMS) instead of aromatic siloxanes. This is highly unexpected, as for other flame properties, such as UL V-0 compliance, the siloxane of choice is typically phenyl based (like octaphenylcyclotetrasiloxane or polyphenylmethylsiloxane) rather than PDMS.

PDMS oil may have the disadvantages of opaqueness and potential for bleach out, due to inherent immiscibility with polycarbonate and its copolymers. Nevertheless, PDMS oil can be formulated to PC-Ester1 to obtain a composition that meets the thresholds for EN45545 R3 applications (DS-4<480) or even R1 or R6 applications (DS-4<300).

Examples 54-58

Examples 54-58 demonstrate the effect of adding polydimethylsiloxane/bisphenol A polycarbonate copolymer having 6 mol % siloxane units (SiPC2) to linear bisphenol A polycarbonate resin (PC1). Formulations and results are shown in Table 8.

TABLE 8

|  | Unit | CEx54 | CEx55 | CEx56 | CEx57 | CEx58 |
|---|---|---|---|---|---|---|
| Component |  |  |  |  |  |  |
| PC1 | Wt % | 100.00 | 87.45 | 74.95 | 49.95 |  |
| SiPC2 | Wt % |  | 12.50 | 25.00 | 50.00 | 100.00 |
| Irgafos 168 | Wt % |  | 0.05 | 0.05 | 0.05 |  |
| Si content | Wt % | 0 | 0.26 | 0.52 | 1.04 | 2.08 |
| Property |  |  |  |  |  |  |
| Smoke density, DS-4 | — | 979 | 513 | 569 | 716 | 935 |

Comparative Examples 54 and 58 show that both linear bisphenol A polycarbonate resin (PC1) and polydimethylsiloxane/bisphenol A polycarbonate copolymer having 6 wt. % siloxane units (SiPC2) have relatively high smoke densities. However, as shown in comparative Examples 55-57, when relatively low amounts of SiPC2 are added to PC1, the smoke density values decrease significantly. Nonetheless, the decrease in DS-4 is rather limited and the values remain rather high, and the formulations containing PC 1 and SiPC2 do not meet the HL2 requirements for EN45545 R1 or R6 applications (DS-4<300) or even R3 applications (DS-4<480).

Examples 59-62

Examples 59-62 demonstrate that the effect of addition of polydimethylsiloxane/bisphenol A polycarbonate copolymer having 6 wt. % siloxane units (SiPC2) to polycarbonate polymers and copolymers, in reducing smoke density, as described in the previous examples, applies as well to blends of polycarbonate polymers and/or copolymers with polyether imide (PEI). Results and formulations are shown in Table 9.

TABLE 9

|  | Unit | CEx59 | Ex60 | Ex61 | Ex62 |
|---|---|---|---|---|---|
| Component |  |  |  |  |  |
| PC1 | Wt % | 85.00 | 64.00 | 21.00 |  |
| PCSi2 | Wt % |  | 21.00 | 64.00 | 85.00 |
| PEI | Wt % | 15.00 | 15.00 | 15.00 | 15.00 |
| Property |  |  |  |  |  |
| Smoke density, DS-4 | — | 703 | 296 | 196 | 198 |

Comparative example 59 shows that the blend of linear bisphenol A polycarbonate (PC1) and polyetherimide (PEI) without polydimethylsiloxane/bisphenol A polycarbonate copolymer having 6 wt. % siloxane units (SiPC2) has a relatively high smoke density value (703), which does not comply with the EN45545 rail standard (2013) threshold for qualifying under R1 and R6 material selection criteria for any Hazard Level (HL) applications ((DS-4<600 for HL-1, DS-4<300 for HL2 and DS-4<150 for HL3)), even with 15 wt. % of PEI present in the composition. Addition of SiPC2 to the PC1/PEI blend, at a SiPC2 level as low as 21 wt. % results in significant reduction in smoke density values (DS-4 value of 296, Example 60, a 58% reduction), which would comply with the EN45545 rail standard (2013) threshold for qualifying under R1 or R6 material selection criteria for HL2 applications. The addition of more SiPC2 reduces DS-4 values even further to values below 200.

Examples 63-77

These examples demonstrate that the effect of polydimethylsiloxane/bisphenol A polycarbonate copolymer addition on smoke density reduction is also applicable to compositions containing bisphenol A diphosphate (BPADP) as well.

Examples 63-72

Examples 63-72 demonstrate that the addition of BPADP together with polydimethylsiloxane/bisphenol A polycarbonate copolymer having 6 wt. % siloxane units (SiPC2) to poly(phthalate-carbonate) copolymer having 81 mol % ester units (PC-Ester1) improves the smoke density, the heat release and the melt flow of PC-Ester 1-containing compositions, while retaining ductile multiaxial impact at +23° C. and 0° C. Results and formulations are shown in Table 10.

TABLE 10

|  | Unit | Ex63 | Ex64 | Ex65 | Ex66 | Ex67 | Ex68 | Ex69 | Ex70 | Ex71 | Ex72 |
|---|---|---|---|---|---|---|---|---|---|---|---|
| Component |  |  |  |  |  |  |  |  |  |  |  |
| PC-Ester1 | Wt % | 88.07 | 84.92 | 83.12 | 81.31 | 79.63 | 77.94 | 74.57 | 84.10 | 73.00 | 66.40 |
| SiPC2 | Wt % | 9.79 | 9.44 | 9.24 | 9.04 | 8.85 | 8.66 | 8.29 | 4.42 | 15.48 | 22.12 |
| Coated TiO2 | Wt % | 2.00 | 2.00 | 2.00 | 2.00 | 2.00 | 2.00 | 2.00 | 2.00 | 2.00 | 2.00 |
| Carbon black | Wt % | 0.10 | 0.10 | 0.10 | 0.10 | 0.10 | 0.10 | 0.10 | 0.10 | 0.10 | 0.10 |
| Irgafos 168 | Wt % | 0.05 | 0.05 | 0.05 | 0.05 | 0.05 | 0.05 | 0.05 | 0.05 | 0.05 | 0.05 |
| BPADP | Wt % | 0.00 | 3.5 | 5.5 | 7.50 | 9.38 | 11.3 | 15 | 9.38 | 9.38 | 9.38 |
| SiPC2/PC-Ester1 ratio | % | 10 | 10 | 10 | 10 | 10 | 10 | 10 | 5 | 17.5 | 25 |
| Property |  |  |  |  |  |  |  |  |  |  |  |
| Smoke density, DS-4 | — | 308 | 178 | 184 | 194 | 243 | 205 | 217 | 206 | 179 | 177 |
| Heat release, MAHRE | kW/m$^2$ | 129 | NA | NA | 58 | 65 | 62 | 69 | 65 | 66 | 73 |
| MAI +23° C., Energy | J | 141 | NA[1] | NA[1] | 102 | NA[1] | 130 | 121 | 129 | 130 | 123 |
| MAI, +23° C., ductility | % | 100 | NA[2] | NA[2] | 100 | NA[2] | 100 | 100 | 100 | 100 | 100 |
| MAI, 0° C., energy | J | 130 | NA[1] | NA[1] | 83 | 103 | 112 | 102 | 118 | 104 | 115 |
| MAI, 0° C., ductility | % | 100 | NA[2] | NA[2] | 100 | 100 | 100 | 75 | 100 | 100 | 100 |

TABLE 10-continued

| | Unit | Ex63 | Ex64 | Ex65 | Ex66 | Ex67 | Ex68 | Ex69 | Ex70 | Ex71 | Ex72 |
|---|---|---|---|---|---|---|---|---|---|---|---|
| MVR, 300° C., 1.2 kg | Cm³/10 min | 1.9 | 2.1 | 2.6 | 4.5 | 5.7 | 6.9 | 10.5 | 5.2 | 6.2 | 7.1 |
| MV, 300° C., 1500 s⁻¹ | Pa · s | * | * | * | 573 | 375 | 301 | 235 | 394 | 328 | 289 |

[1]It is expected that the multiaxial impact energy will be above 100 J, as all tested compositions with higher BPADP loadings have higher energy values.
[2]It is expected that the ductility will be 100% as the compositions with higher BPADP loadings have been tested to have ductility of 100%.
* Not measurable Table 10 demonstrates that BPADP has a positive effect on the smoke density as it further reduces DS-4 values of a composition containing PC-Ester1 and SiPC2, but not BPADP, from 308 (Example 63) to values between 170 and 250 (Examples 64-69), which is significantly below the 300 threshold for HL2 compliance for R1 or R6 applications, for compositions containing PC-Ester1, SiPC2 and BPADP with the same ratio of SiPC2 to PC-Ester1 (10%). The data also shows that BPADP has a positive effect on MAHRE, as it reduces MAHRE of a composition containing PC-Ester1 and SiPC2, but not BPADP, from 129 (Example 63) to values below the 90 threshold (Examples 66-69) for HL2 compliance for R1 or R6 applications after different amounts of BPADP are added. MAHRE values of these compositions are even close to the 60 threshold for HL3 compliance for R1 and R6 applications.

Same trends are observed at different SiPC2 to PC-Ester1 ratios (Example 70-72), which also have reduced DS-4 values (between 170 and 210) and MAHRE values (between 65 and 73), for SiPC2/PC-Ester1 ratios ranging from 5 to 25%.

As such, the addition of BPADP to compositions containing SiPC2 and PC-Ester1 results in compositions that can be fully compliant with the HL2 requirements for R1 and R6 applications according to EN45545, which requires a combination of DS-4 values below 300 and MAHRE values below 90, provided that the other required properties meet the selection criteria as well. Therefore, these compositions can be used in these types of applications.

Furthermore, BPADP also improves the melt flow, as can be seen in the increase in MVR and decrease in MV for Examples 64-72 compared to Example 63. The MVR and MV values can be tuned by optimizing the SiPC2 to PC-Ester1 ratio and/or the BPADP content of the composition.

The addition of BPADP reduces the multiaxial impact energy properties, but all samples retain 100% ductility even at 0° C., except the sample with the highest BPADP loading (Example 69, 15 wt. % BPADP), which has 75% ductility. This demonstrates that ductility is retained, even at relatively high BPADP loadings up to 11 and even 15 wt. %. As such, compositions containing SiPC2, PC-Ester1 and BPADP have a good combination of full HL2 compliance for R6 applications (smoke density and heat release), sufficient melt flow for molding of large and complex parts and retention of good practical impact properties. An optimal combination of these properties can be achieved upon proper formulation, which makes these compositions suitable for train interior parts that fully comply with R6 HL-2 requirements.

Examples 73-75

Examples 73-75 show that relatively small quantities of linear bisphenol A polycarbonate (PC2) can be added to compositions containing polydimethylsiloxane/bisphenol A polycarbonate copolymer having 6 wt. % siloxane units (SiPC2) and poly(phthalate-carbonate) copolymer having 81 mol % ester units (PC-Ester1), for instance to improve impact or flow, without deteriorating smoke density too much.

The formulations and the results are shown in Table 11.

TABLE 11

| | Unit | Ex73 | Ex74 | Ex75 |
|---|---|---|---|---|
| Component | | | | |
| PC-Ester1 | Wt % | 67.75 | 57.40 | 47.40 |
| SiPC2 | Wt % | 22.60 | 23.00 | 23.00 |
| PC3 | Wt % | | 10.00 | 20.00 |
| Coated TiO₂ | Wt % | 2.00 | 2.00 | 2.00 |
| Carbon black | Wt % | 0.10 | 0.10 | 0.10 |
| Irgafos 168 | Wt % | 0.05 | 0.05 | 0.05 |
| BPADP | Wt % | 7.50 | 7.50 | 7.50 |
| Property | | | | |
| Smoke density, DS-4 | — | 186 | 244 | 266 |
| MAI +23° C., Energy | J | 113 | 123 | 126 |
| MAI, +23° C., ductility | % | 100 | 100 | 100 |
| MAI, 0° C., energy | J | 96 | 128 | 136 |
| MAI, 0° C., ductility | % | 100 | 100 | 100 |
| MVR, 300° C., 1.2 kg | Cm³/10 min | 5.5 | 6.6 | 9.6 |
| MV, 300° C., 1500 s⁻¹ | Pa · s | 343 | 293 | 243 |

Examples 74-75 show that the addition of small quantities of linear bisphenol A polycarbonate (PC2) to a composition containing BPADP, polydimethylsiloxane/bisphenol A polycarbonate copolymer having 6 wt. % siloxane units (SiPC2) and poly(phthalate-carbonate) copolymer having 81 mol % ester units (PC-Ester1) gives an increase in smoke density (DS-4 values of 244 and 246 for Examples 74 and 75) compared to the same composition without PC3 (DS-4 value of 186). However, the increase is relatively minor and the DS-4 values still remain below the HL2 threshold (DS-4<300) for R1 or R6 applications.

The addition of PC2 to the composition results in a significant improvement in melt flow as evidenced by the increase in MVR (from 5.5 for Example 73 to 6.6 and 9.6 for Examples 74 and 75 respectively) and decrease in MV (from 343 for Example 73 to 293 and 243 respectively for Examples 74 and 75).

Furthermore, the addition of PC2 to the composition also results in an improvement in practical impact properties, as the multiaxial impact energy at all measured temperatures increases for Examples 74 and 75 compared to Example 73.

As such, the addition of small quantities of linear bisphenol A polycarbonate (PC2) can be used to further improve the property profile of the compositions containing BPADP, polydimethylsiloxane/bisphenol A polycarbonate copolymer (SiPC2) and poly(phthalate-carbonate) copolymer (PC-Ester1), including melt flow and practical impact, while retaining the excellent smoke density properties of these compositions without the linear bisphenol A polycarbonate.

Examples 76-77

Examples 76-77 show the effect of changing the poly(phthalate-carbonate) copolymer type (PC-Ester2 instead of PC-Ester 1) in compositions containing polydimethylsiloxane/bisphenol A polycarbonate copolymer having 6 wt. % siloxane units (SiPC2), BPADP and poly(phthalate-carbonate) copolymer.

The formulations and the results are shown in Table 12.

TABLE 12

| | Unit | Ex76 | Ex77 |
|---|---|---|---|
| Component | | | |
| PC-Ester1 | Wt % | 70.58 | |
| SiPC2 | Wt % | 23.53 | 23.53 |
| PC-Ester2 | Wt % | | 70.58 |
| Coated TiO2 | Wt % | 2.00 | 2.00 |
| Carbon black | Wt % | 0.10 | 0.10 |
| Irgafos 168 | Wt % | 0.05 | 0.05 |
| BPADP | Wt % | 3.75 | 3.75 |
| Property | | | |
| Smoke density, DS-4 | — | 194 | 206 |

Examples 76 and 77 show that comparable smoke density values are obtained when PC-Ester1 (Example 76, DS-4 of 194), which contains 81 mol % ester groups, is replaced with PC-Ester2 (Example 77, DS-4 of 206), which contains 60 mol % ester groups. As such, effects observed in the previous examples are not limited to PC-Ester1 alone, but are also applicable to alternative types of the poly(phthalate-carbonate) copolymer.

Example 78

Example 78 demonstrates that, similarly to Examples 63-77, the addition of BPADP together with polydimethylsiloxane/bisphenol A polycarbonate copolymer having 6 wt. % siloxane units (SiPC2) also improves smoke density and heat release of PPP-BP/BPA copolymer, while maintaining good transmission and haze properties. Results and formulations are shown in Table 13.

TABLE 13

| | Unit | Ex 78 |
|---|---|---|
| Component | | |
| PPP-BP/BPA | Wt % | 89.68 |
| SiPC2 | Wt % | 5.00 |
| Irganox 1076 | Wt % | 0.04 |
| TINUVIN 329 | Wt % | 0.20 |
| Irgafos 168 | Wt % | 0.08 |
| BPADP | Wt % | 5.00 |
| Property | | |
| Smoke density, DS-4 | — | 166 |
| Heat release, MAHRE | kW/m$^2$ | 80 |
| Transmission | % | 85.8 |
| Haze | — | 1.97 |

Table 13 shows that the addition of both BPADP and SiPC2 to PPP-BP/BPA copolymer results in a combination of low smoke density (DS-4 of 166) and low heat release (MAHRE of 80). Both values are below the HL2 thresholds for R6 applications for DS-4 (<300) and MAHRE (<90), which makes these compositions fully with the HL2 requirements for R$^6$ applications according to EN45545, provided that the other required properties meet the selection criteria as well.

Furthermore, transmission is still relatively high upon addition of small amounts of SiPC2 ((85.8%) and haze is still relatively low (1.97), which allows to make compositions that both are compliant with the HL2 requirements for smoke density and heat release for R$^6$ applications according to EN45545 and still have acceptable optical properties to be suitable for transparent applications, as well as diffuse, translucent and opaque colors, which can be tuned via a colorant package. Again, in general, transparent compositions can be tuned by the architecture of the polydimethylsiloxane/bisphenol A polycarbonate copolymer.

Examples 79-86

These examples demonstrate the effect of TiO$_2$ addition on smoke density reduction to compositions containing polydimethylsiloxane/bisphenol A polycarbonate copolymer having 6 wt. % siloxane units (SiPC2), poly(phthalate-carbonate) copolymer having 81 mol % ester units (PC-Ester1) and bisphenol A diphosphate (BPADP).

TABLE 14

| | Unit | Ex 79 | Ex 80 | Ex 81 | Ex 82 | Ex 83 | Ex 84 | Ex 85 | Ex 86 |
|---|---|---|---|---|---|---|---|---|---|
| Component | | | | | | | | | |
| PC-Ester1 | Wt % | 74.57 | 77.94 | 81.31 | 64.95 | 76.46 | 79.83 | 83.21 | 66.53 |
| SiPC2 | Wt % | 8.29 | 8.66 | 9.04 | 21.65 | 8.50 | 8.87 | 9.25 | 22.18 |
| Coated TiO2 | Wt % | 2.00 | 2.00 | 2.00 | 2.00 | | | | |
| Carbon black | Wt % | 0.10 | 0.10 | 0.10 | 0.10 | | | | |
| Irgafos 168 | Wt % | 0.05 | 0.05 | 0.05 | 0.05 | 0.05 | 0.05 | 0.05 | 0.05 |
| BPADP | Wt % | 15 | 11.25 | 7.50 | 11.25 | 15 | 11.25 | 7.50 | 11.25 |
| SiPC2/PC-Ester1 ratio | % | 10 | 10 | 10 | 25 | 10 | 10 | 10 | 25 |
| Property | | | | | | | | | |
| Smoke density, DS-4 | — | 217 | 205 | 194 | 184 | 309 | 326 | 289 | 316 |

A comparison of compositions with similar BPADP loading and SiPC2/PC-Ester1 ratio with and without TiO$_2$ shows that TiO$_2$ addition has a beneficial effect on the smoke density, comparing Examples 79 (DS-4 of 217) and 83 (DS-4 of 309), Examples 80 (DS-4 of 205) and 84 (DS-4 of 326), Examples 81 (DS-4 of 194) and 85 (DS-4 of 289) and Examples 82 (DS-4 of 184) and 86 (316). Therefore, TiO$_2$ can be added to the composition to further improve the smoke density compared to the composition without TiO$_2$.

The singular forms "a," "an," and "the" include plural referents unless the context clearly dictates otherwise. "Or" means "and/or." The endpoints of all ranges directed to the same component or property are inclusive and independently combinable. The suffix "(s)" as used herein is intended to include both the singular and the plural of the term that it modifies, thereby including at least one of that term (e.g., "colorant(s)" includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Unless otherwise indicated, exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:
1. A composition comprising
a first polycarbonate having a limited oxygen index of greater than 26%, wherein an article molded from the first polycarbonate has a smoke density after 4 minutes (DS-4) of greater than 600 determined according to ISO 5659-2 on a 3 mm thick plaque at 50 kW/m$^2$; and
a second polymer different from the first polycarbonate, the second polymer comprising a poly(carbonate-siloxane) copolymer, a polydialkylsiloxane, or a combination comprising at least one of the foregoing; wherein an article molded from the second polymer has a smoke density after 4 minutes (DS-4) of greater than 600 determined according to ISO 5659-2 on a 3 mm thick plaque at 50 kW/m$^2$;
wherein an article molded from the composition has a smoke density after 4 minutes (DS-4) of less than or equal to 480 determined according to ISO 5659-2 on a 3 mm thick plaque at 50 kW/m$^2$.
wherein the first polycarbonate is a polycarbonate copolymer comprising first repeating units and second repeating units, wherein the first repeating units are not the same as the second repeating units, and wherein
the first repeating units are bisphenol carbonate units of the formula

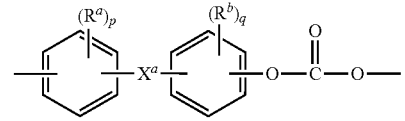

wherein
$R^a$ and $R^b$ are each independently $C_{1-12}$ alkyl, $C_{1-12}$ alkenyl, $C_{3-8}$ cycloalkyl, or $C_{1-12}$ alkoxy,
p and q are each independently 0 to 4, and
$X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and
the second repeating units comprise arylate ester units or bisphenol carbonate units that are not the same as the first repeating bisphenol carbonate units, and
wherein the poly(carbonate-siloxane is present in an amount effective to provide 0.1 wt. % to 1.00 wt. % of silicon based on the total weight of the composition; and
wherein the composition is free of a polyetherimide.
2. The composition of claim 1, wherein in the polycarbonate copolymer, the first repeating units are bisphenol A carbonate units.
3. The composition of claim 1, wherein in the polycarbonate copolymer, the second repeating units are carbonate units of the formula

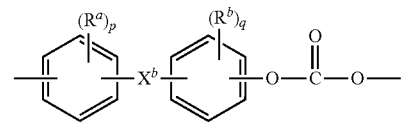

wherein
$R^a$ and $R^b$ are each independently $C_{1-12}$ alkyl, $C_{1-12}$ alkenyl, $C_{3-8}$ cycloalkyl, or $C_{1-12}$ alkoxy,
p and q are each independently integers of 0 to 4, and
$X^b$ is $C_{2-32}$ bridging hydrocarbon group that is not the same as the $X^a$ in the first repeating bisphenol carbonate units.

4. The composition of claim 3, wherein the second repeating units of the polycarbonate copolymer are carbonate units of the formula

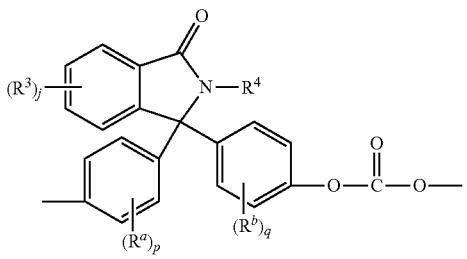

wherein
$R^a$ and $R^b$ are each independently a $C_{1-3}$ alkyl group,
p and q are each independently integers of 0 to 4,
$R^3$ is each independently a $C_{1-6}$ alkyl group,
j is 0 to 4, and
$R^4$ is hydrogen, $C_{1-6}$ alkyl, phenyl optionally substituted with 1 to 5 $C_{1-6}$ alkyl groups.

5. The composition of claim 4, wherein the second repeating units are carbonate units of the formula

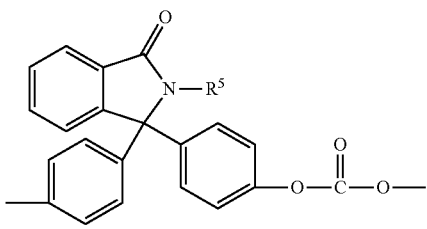

wherein $R^5$ is hydrogen, $C_{1-6}$ alkyl, or phenyl optionally substituted with 1 to 5 $C_{1-6}$ alkyl groups.

6. The composition of claim 4, wherein $R^5$ is phenyl.

7. The composition of claim 1, wherein the polycarbonate copolymer is a poly(carbonate-bisphenol arylate ester) comprising bisphenol A carbonate units as the first repeating units and arylate ester units as the second repeating units, wherein the second repeating units are of the formula

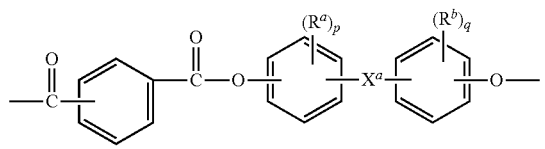

wherein
$R^a$ and $R^b$ are each independently $C_{1-12}$ alkyl, $C_{1-12}$ alkenyl, $C_{3-8}$ cycloalkyl, or $C_{1-12}$ alkoxy,
p and q are each independently 0 to 4, and
$X^a$ is a single bond, —O—, —S—, —S(O)—, —S(O)$_2$—, —C(O)—, a $C_{1-11}$ alkylidene of the formula —C(R$^c$)(R$^d$)— wherein R$^c$ and R$^d$ are each independently hydrogen or $C_{1-10}$ alkyl, or a group of the formula —C(=R$^e$)— wherein R$^e$ is a divalent $C_{1-10}$ hydrocarbon group.

8. The composition of claim 7, wherein
$R^a$ and $R^b$ are each independently a $C_{1-3}$ alkyl,
p and q are each independently 0 or 1,
$X^a$ is alkylidene of formula —C(R$^c$)(R$^d$)— wherein R$^c$ and R$^d$ are each $C_{1-6}$ alkyl, and the ratio of the weight percent of the ester units to the carbonate units in the poly(carbonate-bisphenol arylate ester) is 50:50 to 99:1.

9. The composition of claim 7, wherein the poly(carbonate-bisphenol arylate ester) is a poly(bisphenol A carbonate)-co-(bisphenol phthalate ester) comprising 55 to 65 wt. % of the ester units, wherein the ester units have a molar ratio of isophthalate to terephthalate of 45:55 to 55:45.

10. The composition of claim 7, wherein in the poly(carbonate-bisphenol arylate ester) is a poly(bisphenol A carbonate)-co-(bisphenol phthalate ester) comprising 75 to 85 wt. % of the ester units, wherein the ester units have a molar ratio of isophthalate to terephthalate of 98:2 to 88:12.

11. The composition of claim 1, wherein the polycarbonate copolymer is a poly(carbonate-bisphenol arylate ester) comprising bisphenol A carbonate units as the first repeating units and arylate ester units as the second repeating units, wherein the second repeating units are of the formula

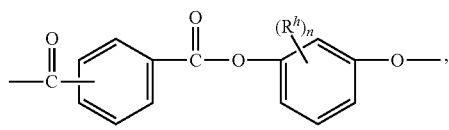

optionally, monoaryl carbonate units of the formula

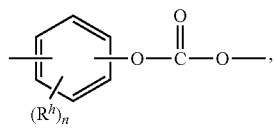

and
optionally, bisphenol ester units of the formula

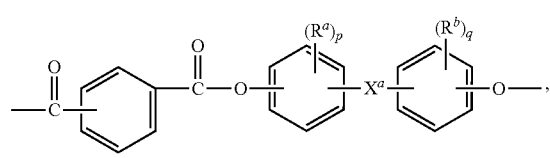

wherein, in the foregoing formulas
$R^h$ is each independently a $C_{1-10}$ hydrocarbon group,
n is 0 to 4,
$R^a$ and $R^b$ are each independently a $C_{1-12}$ alkyl,
p and q are each independently integers of 0 to 4, and
$X^a$ is a single bond, —O—, —S—, —S(O)—, —S(O)$_2$—, —C(O)—, or a $C_{1-13}$ alkylidene of formula —C(R$^c$)(R$^d$)— wherein R$^c$ and R$^d$ are each independently hydrogen or $C_{1-12}$ alkyl, or a group of the formula —C(=R$^e$)— wherein R$^e$ is a divalent $C_{1-12}$ hydrocarbon group.

12. The composition of claim 11, wherein the polycarbonate copolymer comprises
1 to 20 mol % of bisphenol A carbonate units,
20 to 98 mol % of isophthalic acid-terephthalic acid-resorcinol ester units, and
optionally, 1 to 60 mol % resorcinol carbonate units, isophthalic acid-terephthalic acid-bisphenol A ester units, or a combination thereof.

13. The composition of claim 1, wherein the first polycarbonate comprises a branched polycarbonate comprising repeating carbonate units of the formula:

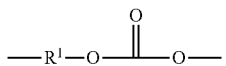

wherein greater than or equal to 60 percent of the total number of $R^1$ groups contain aromatic organic groups and the balance thereof are aliphatic, alicyclic, or aromatic groups; and endcapping groups derived from phenol or a phenol containing a substituent of cyano group, aliphatic groups, olefinic groups, aromatic groups, halogens, ester groups, ether groups, or a combination comprising at least one of the foregoing, and greater than or equal to 3 mole %, based on the total moles of the polycarbonate, of moieties derived from a branching agent.

14. The composition of claim 13, wherein the branching agent comprises trimellitic trichloride, 1,1,1-tris(4-hydroxyphenyl)ethane or a combination of trimellitic trichloride and 1,1,1-tris(4-hydroxyphenyl)ethane.

15. The composition of claim 1, wherein the first polycarbonate further comprises a polycarbonate homopolymer comprising repeating units of the formula

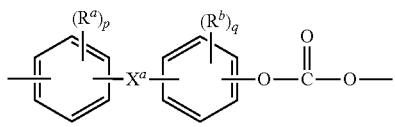

wherein
$R^a$ and $R^b$ are each independently a $C_{1-12}$ alkyl group, $C_{1-12}$ alkenyl, $C_{3-8}$ cycloalkyl, or $C_{1-12}$ alkoxy,
p and q are each independently integers of 0 to 4, and
$X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group.

16. The composition of claim 15, wherein the repeating units are bisphenol A carbonate units.

17. The composition of claim 1, wherein the poly(carbonate-siloxane) copolymer comprises first repeating units and second repeating units, wherein
the first repeating units are bisphenol carbonate units of the formula

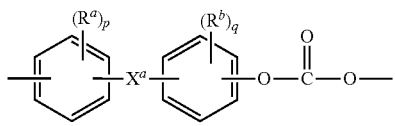

wherein
$R^a$ and $R^b$ are each independently $C_{1-12}$ alkyl, $C_{1-12}$ alkenyl, $C_{3-8}$ cycloalkyl, or $C_{1-12}$ alkoxy,
p and q are each independently 0 to 4, and
$X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and the second repeating units are polysiloxane units of the formula

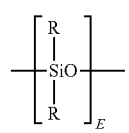

wherein
R is each independently a $C_{1-13}$ monovalent hydrocarbon group, and
E has an average value of 2 to 200.

18. The composition of claim 17, wherein the second repeating units are siloxane units of the formulas

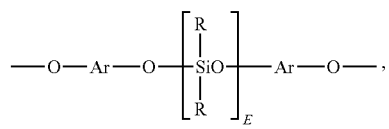

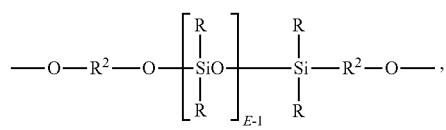

or a combination comprising at least one of the foregoing, wherein
R is each independently a $C_{1-13}$ monovalent hydrocarbon group,
Ar is each independently a $C_{6-30}$ aromatic group,
$R^2$ is each independently a $C_{2-8}$ alkylene group, and
E has an average value of 2 to 200.

19. The composition of claim 17, wherein the siloxane units are of the formula

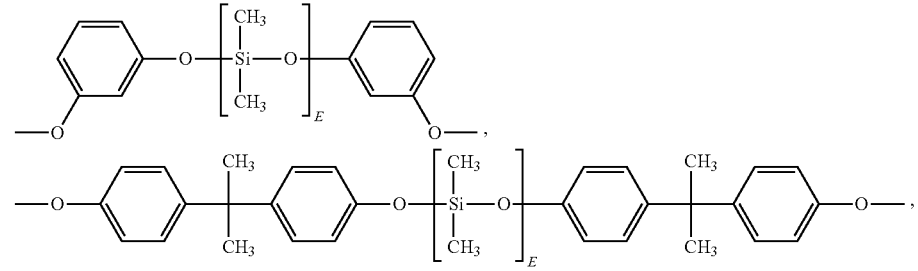

or a combination comprising at least one of the foregoing, wherein E has an average value of 2 to 200.

20. The composition of claim 17, wherein the siloxane units are of the formula

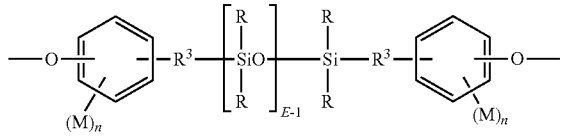

wherein
R is each independently a $C_{1-13}$ monovalent hydrocarbon group,
$R^3$ is independently a divalent $C_{2-8}$ aliphatic group,
M is each independently a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, or a combination comprising at least one of the foregoing,
n is each independently 0, 1, 2, 3, or 4, and
E has an average value of 2 to 200.

21. The composition of claim 20, wherein the siloxane units are siloxane units of the formula

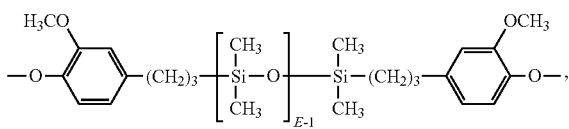

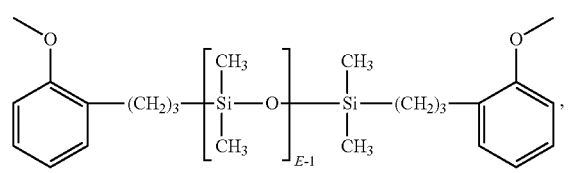

or a combination comprising at least one of the foregoing, wherein E has an average value of 2 to 200.

22. The composition of claim 17, wherein E has an average value of 5 to 120.

23. The composition of claim 1, wherein the second polymer is present in an amount effective to provide 0.10 wt. % to 1.00 wt. % silicon based on the total weight of the composition.

24. The composition of claim 1, wherein the polydialkylsiloxane has a viscosity from 10 to 100,000,000 mPa·s at 25° C., and wherein the alkyl groups are the same or different each have 1 to 10 carbon atoms.

25. The composition of claim 1, wherein the polydialkylsiloxane is a polydimethyl siloxane having a viscosity from 50 to 1,000 mPa·s at 25° C.

26. A composition of claim 4 comprising, based on the weight of the composition, 65 to 95 wt. % of a polycarbonate, wherein the first polycarbonate is a polycarbonate copolymer comprising
bisphenol A carbonate units, and
units of the formula

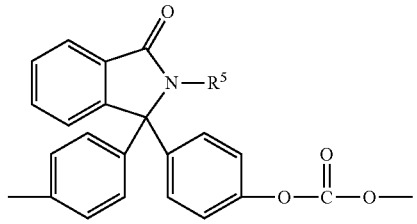

wherein $R^5$ is hydrogen, phenyl optionally substituted with 1 to 5 $C_{1-6}$ alkyl groups, or $C_{1-4}$ alkyl; and
5 to 35 wt. % of the second polymer, wherein the second is a poly(carbonate-siloxane) comprising
bisphenol A carbonate units, and
siloxane units of the formula

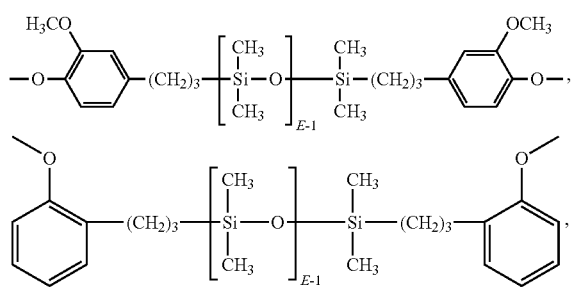

or a combination comprising at least one of the foregoing, wherein E has an average value of 2 to 200;
wherein the poly(carbonate-siloxane) comprises 0.5 to 55 wt. % of siloxane units based on the total weight of the poly(carbonate-siloxane);
wherein no or substantially no brominated polycarbonate is present in the composition; and the composition is free of a polyetherimide;
wherein an article molded from each of the polycarbonate copolymer and the poly(carbonate-siloxane) has a smoke density after 4 minutes (DS-4) of greater than 600 determined according to ISO 5659-2 on a 3 mm thick plaque at 50 kW/m$^2$; and
wherein an article molded from the composition comprising the polycarbonate copolymer and the poly(carbonate-siloxane) has a smoke density after 4 minutes (DS-4) of less than or equal to 480 determined according to ISO 5659-2 on a 3 mm thick plaque at 50 kW/m$^2$.

27. The composition of claim 26, wherein the composition comprises 5 wt. to 20 wt. % of the poly(carbonate-siloxane) having 1 to 10 wt. % of siloxane units based on the total weight of the poly(carbonate-siloxane), and the composition has a transmission of greater than 60% determined according to ASTM D1003.

28. A composition of claim 10 comprising, based on the weight of the composition,
70 to 99 wt. % of the first polycarbonate, wherein the first polycarbonate is a poly(bisphenol A carbonate)-co-(bisphenol phthalate ester) comprising 75 to 85 wt. % of the ester units, wherein the ester units have a molar ratio of isophthalate to terephthalate of 98:2 to 88:12; and 1 to 30 wt. % of the second polymer, wherein the second polymer is a poly(carbonate-siloxane) comprising
bisphenol A carbonate units, and
siloxane units of the formula

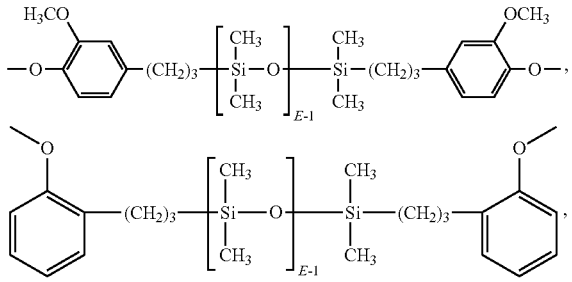

or a combination comprising at least one of the foregoing,
wherein E has an average value of 5 to 120;
wherein the poly(carbonate-siloxane) comprises 0.5 to 55 wt. % of siloxane units based on the total weight of the poly(carbonate-siloxane);
wherein an article molded from each of the poly(bisphenol A carbonate)-co-(bisphenol phthalate ester) or the poly(carbonate-siloxane) has a smoke density after 4 minutes (DS-4) of greater than 900 determined according to ISO 5659-2 on a 3 mm thick plaque at 50 kW/m²; and
wherein an article molded from the composition comprising the poly(bisphenol A carbonate)-co-(bisphenol phthalate ester) and the poly(carbonate-siloxane) has a smoke density after 4 minutes (DS-4) of less than or equal to 480 determined according to ISO 5659-2 on a 3 mm thick plaque at 50 kW/m², and
wherein the poly(carbonate-siloxane) is present in an amount effective to provide 0.1 wt. % to 1.00 wt. % of silicon based on the total weight of the composition; and
wherein the composition is free of a polyetherimide.

29. The composition of claim 28, wherein the composition comprises from 1 wt. % to 20 wt. % of the poly(carbonate-siloxane) comprising from 1 to 10 wt. % of siloxane units based on the total weight of the poly(carbonate-siloxane), and wherein the composition has a transmission of greater than 80% determined according to ASTM D1003.

30. A composition of claim 10 comprising, based on the weight of the composition,
95 to 99.5 wt. % of the first polycarbonate, wherein the first polycarbonate is a poly(bisphenol A carbonate)-co-(bisphenol phthalate ester) comprising 75 to 85 wt. % of the ester units, wherein the ester units have a molar ratio of isophthalate to terephthalate of 98:2 to 88:12; and
0.5 to 5 wt. % of the second polymer, wherein the second polymer is polydimethylsiloxane;
wherein an article molded from the poly(bisphenol A carbonate)-co-(bisphenol phthalate ester) has a smoke density after 4 minutes (DS-4) of greater than 900 determined according to ISO 5659-2 on a 3 mm thick plaque at 50 kW/m²; and
wherein an article molded from the composition comprising the poly(bisphenol A carbonate)-co-(bisphenol phthalate ester) and the polydimethyl siloxane has a smoke density after 4 minutes (DS-4) of less than or equal to 480 determined according to ISO 5659-2 on a 3 mm thick plaque at 50 kW/m².

31. The composition of claim 1, wherein no or substantially no brominated polycarbonate is present in the composition.

32. The composition of claim 1, further comprising an organophosphorus compound in an amount effective to provide 0.1-2 wt. % phosphorus, based on the total weight of the composition.

33. The composition claim 32, wherein the organophosphorus compound is an aromatic organophosphorus compounds having at least one organic aromatic group and at least one phosphorus-containing group, or an organic compounds having at least one phosphorus-nitrogen bond.

34. The composition of claim 33, wherein the aromatic organophosphorus compound comprises a $C_{3-30}$ aromatic group and a phosphate group, phosphite group, phosphonate group, phosphinate group, phosphine oxide group, phosphine group, phosphazene, or a combination comprising at least one of the foregoing phosphorus-containing groups.

35. The composition of claim 33, wherein the aromatic organophosphorus compound is of the formula

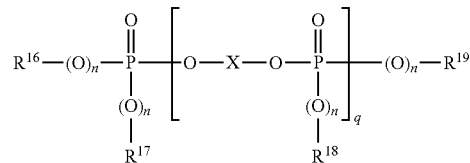

wherein
$R^{16}$, $R^{17}$, $R^{18}$ and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, and
X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is aromatic,
n is each independently 0 or 1, and
q is from 0.5 to 30.

36. The composition of claim 35, wherein
each of $R^{16}$, $R^{17}$, $R^{18}$, and $R^{19}$ is phenyl,
X is of the formula

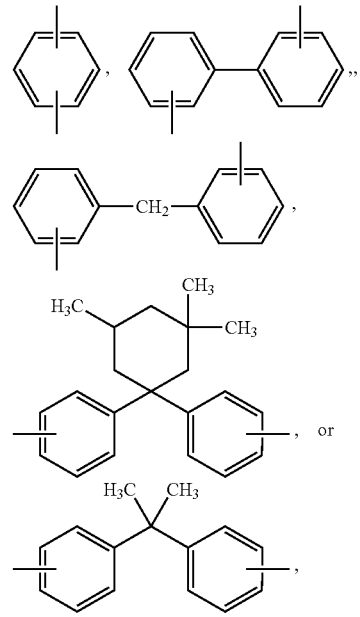

each n is 1, and
p is 1-5.

37. The composition of claim 33, wherein the aromatic organophosphorus compound is bisphenol A bis(diphenyl phosphate), triphenyl phosphate, resorcinol bis(diphenyl phosphate), tricresyl phosphate, or a combination comprising at least one of the foregoing.

38. A composition of claim 10 comprising, based on the weight of the composition,
50 to 93 wt. % of the first polycarbonate, wherein the first polycarbonate is a poly(bisphenol A carbonate)-co-(bisphenol phthalate ester) comprising 75 to 85 wt. % of the ester units, wherein the ester units have a molar ratio of isophthalate to terephthalate of 98:2 to 88:12;
4 to 30 wt. % of the second polymer, wherein the second polymer is a poly(carbonate-siloxane) comprising bisphenol A carbonate units, and
siloxane units of the formula

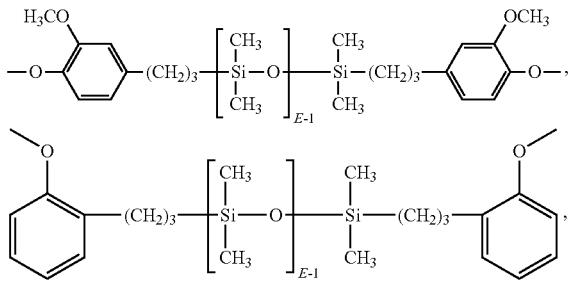

or a combination comprising at least one of the foregoing, wherein E has an average value of 5 to 120;
wherein the poly(carbonate-siloxane) comprises 0.5 to 55 wt. % of siloxane units based on the total weight of the poly(carbonate-siloxane);
wherein the composition further comprises 3 to 20 wt. % of bisphenol A bis(diphenyl phosphate), based on the weight of the composition;
wherein an article molded from each of the poly(bisphenol A carbonate)-co-(bisphenol phthalate ester) or the poly(carbonate-siloxane) has a smoke density after 4 minutes (DS-4) of greater than 900 determined according to ISO 5659-2 on a 3 mm thick plaque at 50 kW/m$^2$; and
wherein an article molded from the composition has a smoke density after 4 minutes (DS-4) of less than or equal to 300 determined according to ISO 5659-2 on a 3 mm thick plaque at 50 kW/m$^2$, and a maximum average heat release (MAHRE) of less than or equal to 90 kW/m$^2$ determined according to ISO 5660-1 on a 3 mm thick plaque at 50 kW/m$^2$, and
wherein the poly(carbonate-siloxane) is present in an amount effective to provide 0.1 wt. % to 1.00 wt. % of silicon based on the total weight of the composition; and
wherein the composition is free of a polyetherimide.

39. A composition of claim 4 comprising, based on the weight of the composition,
45 to 92 wt. % of the first polycarbonate, wherein the first polycarbonate is a polycarbonate copolymer comprising bisphenol A carbonate units, and
units of the formula

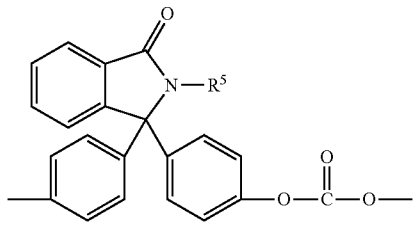

wherein R$^5$ is hydrogen, phenyl optionally substituted with 1 to 5 C$_{1-6}$ alkyl groups, or C$_{1-4}$ alkyl;

5 to 35 wt. % of the second polymer, wherein the second polymer is a poly(carbonate-siloxane) comprising bisphenol A carbonate units, and
siloxane units of the formula

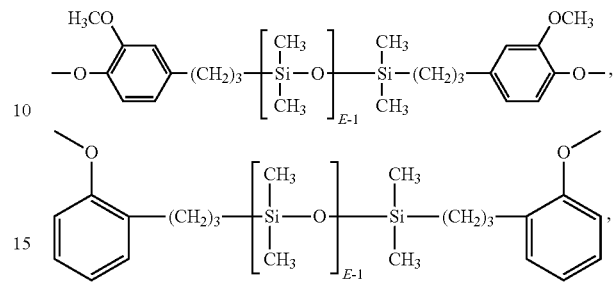

or a combination comprising at least one of the foregoing, wherein E has an average value of 2 to 200;
wherein the poly(carbonate-siloxane) comprises 0.5 to 55 wt. % of siloxane units based on the total weight of the poly(carbonate-siloxane);
wherein the composition further comprises 3 to 20 wt. % of bisphenol A bis(diphenyl phosphate), based on the total weight of the composition; and the composition is free of a polyetherimide;
wherein an article molded from each of the polycarbonate copolymer and the poly(carbonate-siloxane) has a smoke density after 4 minutes (DS-4) of greater than 600 determined according to ISO 5659-2 on a 3 mm thick plaque at 50 kW/m$^2$; and
wherein an article molded from the composition comprising the polycarbonate copolymer, the poly(carbonate-siloxane), and the bisphenol A bis(diphenyl phosphate) has a smoke density after 4 minutes (DS-4) of less than or equal to 300 determined according to ISO 5659-2 on a 3 mm thick plaque at 50 kW/m$^2$, and a maximum average heat release (MAHRE) of less than or equal to 90 kW/m$^2$ determined according to ISO 5669-1 on a 3 mm thick plaque at 50 kW/m$^2$.

40. The composition of claim 38, wherein the composition has a melt volume flow rate of 4 to about 30 cc/10 min, measured at 300° C./1.2 Kg at 360 second dwell according to ISO 1133.

41. The composition of claim 40, wherein the composition has
an MAI equal to or higher than 100 J, determined at 23° C. at an impact speed of 4.4 m/second in accordance with ISO 6603 on discs with a thickness of 3.2 mm, and
a ductility in multiaxial impact of 75% and higher determined at 23° C. at an impact speed of 4.4 m/second in accordance with ISO 6603 on discs with a thickness of 3.2 mm.

42. The composition of claim 1, further comprising 0.1 to 12 wt. % of TiO$_2$.

43. The composition of claim 1, further comprising no more than 5 wt. % based on the weight of the composition of a processing aid, a heat stabilizer, an antioxidant, an ultra violet light absorber, a colorant, or a combination comprising at least one of the foregoing.

44. The composition of claim 1, wherein an article molded from the composition has a smoke density after 4 minutes (DS-4) of smaller than 300 determined according to ISO 5659-2 on a 3 mm thick plaque at 50 kW/m$^2$.

45. The composition of claim 1, wherein an article molded from the composition has a maximum average heat release (MAHRE) of less than or equal to 90 kW/m$^2$ determined according to ISO 5669-1 on a 3 mm thick plaque at 50 kW/m$^2$.

46. An article selected from a molded article, a thermoformed article, an extruded film, an extruded sheet, one or more layers of a multi-layer article, a substrate for a coated article, and a substrate for a metallized article made from the composition of claim 1.

47. An article made from the composition of claim 1, wherein the article is a marine vehicle, or aircraft interior partition, a train, a marine vehicle, or aircraft seat back, a component of a train, a marine vehicle, or aircraft tray table, a food tray, a train, a marine vehicle, or aircraft interior trim panel, a train, a marine vehicle, or aircraft interior display panel, a train, a marine vehicle, or interior side wall, a component of a train, a marine vehicle, or aircraft baggage storage door, an enclosure for an electronic device, a display unit, or television housing, a component of a food cart, a component of a refrigerator door, a component of magazine rack, a handle, an automobile grille, a component of an air flow regulator, and an aircraft, a marine vehicle, or train interior part or seat component.

48. An article comprising the composition of claim 1, wherein the article comprises a train seat component, a train wall component, a train luggage rack, or a train lighting component.

49. A method of manufacture of an article, comprising molding, extruding, or casting the composition of claim 1 to form the article.

* * * * *